United States Patent
Ono et al.

(10) Patent No.: US 11,802,077 B2
(45) Date of Patent: Oct. 31, 2023

(54) DIFFUSION ELEMENT, LIGHTING MODULE, AND METHOD FOR PROCESSING ASPHERIC LENS

(71) Applicant: AGC Inc., Tokyo (JP)

(72) Inventors: Kensuke Ono, Tokyo (JP); Go Hamada, Tokyo (JP); Kenichi Minami, Tokyo (JP); Kenichi Shioya, Fukushima (JP); Takuma Nishizaka, Fukushima (JP)

(73) Assignee: AGC Inc., Tokyo (JP)

( * ) Notice: Subject to any disclaimer, the term of this patent is extended or adjusted under 35 U.S.C. 154(b) by 408 days.

(21) Appl. No.: 17/022,330

(22) Filed: Sep. 16, 2020

(65) Prior Publication Data

US 2020/0407271 A1 Dec. 31, 2020

Related U.S. Application Data

(63) Continuation of application No. PCT/JP2019/012947, filed on Mar. 26, 2019.

(30) Foreign Application Priority Data

Mar. 26, 2018 (JP) ................................ 2018-058867

(51) Int. Cl.
*F21V 3/06* (2018.01)
*C03C 15/00* (2006.01)
(Continued)

(52) U.S. Cl.
CPC .............. *C03C 15/00* (2013.01); *C03C 19/00* (2013.01); *F21V 3/0615* (2018.02); *G02B 3/04* (2013.01);
(Continued)

(58) Field of Classification Search
CPC ....... F21V 3/0615; G02B 3/04; G02B 5/0236; G02B 5/0278
See application file for complete search history.

(56) References Cited

U.S. PATENT DOCUMENTS

| 6,410,213 B1 | 6/2002 | Raguin et al. |
| 2004/0130790 A1 | 7/2004 | Sales |
| 2018/0306404 A1 | 10/2018 | Hanashima et al. |

FOREIGN PATENT DOCUMENTS

| CN | 101571603 A | 11/2009 |
| CN | 102785025 A | 11/2012 |

(Continued)

OTHER PUBLICATIONS

JP2014-038314A machine English translation (Year: 2014).*

(Continued)

*Primary Examiner* — Anne M Hines
(74) *Attorney, Agent, or Firm* — Oblon, McClelland, Maier & Neustadt, L.L.P.

(57) ABSTRACT

A method for processing into an aspheric lens, includes: a preprocessing step of performing preprocessing on a glass substrate; and an etching step of performing wet etching on the glass substrate subjected to the preprocessing. The preprocessing step includes a step of irradiating a certain position of the glass substrate with a pulsed laser beam such that a partial region inside the glass substrate is modified, thereby generating a density distribution in a thickness direction at the position irradiated with the pulsed laser beam, or a step of forming a predetermined wedge-shaped concave portion in a surface of the glass substrate by use of a chemical or physical processing method.

20 Claims, 24 Drawing Sheets

(51) Int. Cl.
*C03C 19/00* (2006.01)
*G02B 3/04* (2006.01)
*G02B 5/02* (2006.01)

(52) U.S. Cl.
CPC ......... *G02B 5/0236* (2013.01); *G02B 5/0278* (2013.01)

(56) References Cited

FOREIGN PATENT DOCUMENTS

| | | |
|---|---|---|
| CN | 104591549 A | 5/2015 |
| JP | 2006-500621 A | 1/2006 |
| JP | 2007-101833 A | 4/2007 |
| JP | 2007-171858 A | 7/2007 |
| JP | 2014-38314 A | 2/2014 |
| JP | 2016-170912 A | 9/2016 |
| JP | 2017-83815 A | 5/2017 |

OTHER PUBLICATIONS

International Search Report dated Jun. 25, 2019 in PCT/JP2019/012947 filed Mar. 26, 2019, 4 pages.
Morris, G. M. et al., "Engineered diffusers ™ for display and illumination systems: Design, fabrication, and applications," www.RPCphotonics.com, 11 pages.

* cited by examiner

DIFFUSION ELEMENT, LIGHTING MODULE, AND METHOD FOR PROCESSING ASPHERIC LENS

TECHNICAL FIELD

The present invention relates to a method for processing into an aspheric lens. In addition, the present invention relates to a diffusion element, and a lighting module using the same.

BACKGROUND ART

Diffusion elements are used in various optical devices. Examples of such optical devices include a lighting device, and a measuring device for performing three-dimensional measurement.

Some of such optical devices use invisible light such as near infrared light or ultraviolet light. Examples of the optical devices using invisible light include a remote sensing device to be used for face authentication or for focusing in a camera apparatus in a smartphone or the like, a remote sensing device to be connected to a game machine or the like in order to be used for grasping a motion of a user, and a LIDAR (Light Detecting and Ranging) apparatus to be used for detecting a peripheral object in a vehicle or the like. As another example, a lighting device radiates high energy light such as ultraviolet light, blue-violet light or blue light in order to raise plants or eliminate bacteria.

In recent years, such an optical device is requested to radiate light at an emission angle largely shifted from a traveling direction of incident light. For example, a measuring device for focusing in a camera apparatus in a smartphone or the like or for detecting a peripheral object in a near infrared monitoring camera placed indoors or outdoors, or a lighting device or a measuring device to be used for detecting an obstacle or a peripheral object such as a finger in a headset for VR (Virtual Reality) is desired to radiate light to a wide angle range such as a diffusion angle (full angle) of 30° or more or 50° or more in accordance with a view angle of the camera apparatus or a visual field of a human being.

By using a refraction action of a lens, incident light can be radiated to be spread to a certain range. Further, by use of a lens array, light can be emitted in a state where a light quantity distribution is equalized within incident light flux.

Non-Patent Literature 1 describes an example of a diffusion element using a micro-lens array. The diffusion element implements a divergence angle of 100° or more with respect to a laser light source having a wavelength of 633 nm. According to Non-Patent Literature 1, a photoresist (photosensitive polymer) is deposited with a uniform thickness on a glass substrate. The photoresist is then scanned to be exposed to a small laser beam focused from one point to another while the intensity of the laser beam is modulated during the scan. Thus, the degree of exposure on the photoresist is varied. As a result, a surface having an irregular structure which is continuous with a depth can be obtained. Patent Literature 1 describes an example of a laser writing system to be used for manufacturing such a diffusion element.

In addition, Patent Literature 2 describes an example of a diffusion element including a micro-lens array in which paraboloidal micro-lenses are disposed closely while a diffusion angle in examples thereof is about 10°.

Further, Patent Literature 3 describes an example of a diffuser plate made of an inorganic material and a method for manufacturing the same, in which a resist deposited on a transparent substrate is exposed to light through a grayscale mask, then developed and dry-etched to transfer a pattern of the resist to a surface of the transparent substrate.

Further, Patent Literature 4 describes an example of a method for producing lens curved surfaces of aspheric micro-lenses, in which isotropic etching and anisotropic etching are combined. According to the method described in the literature, a substrate is patterned through a resist and a mask and initial holes are formed on the substrate, and isotropic etching is then performed on the mask through the resist, thereby expanding the opening portions of the mask. After that, the resist is removed, and anisotropic etching is then performed on the substrate through the mask having the expanded opening portions, so as to form recessed holes. After that, isotropic etching is performed on the substrate where the recessed holes have been provided, so as to form concave portions.

CITATION LIST

Patent Literature

Patent Literature 1: U.S. Pat. No. 6,410,213
Patent Literature 2: JP-T-2006-500621 (the term "JP-T" as used herein means a published Japanese translation of a PCT patent application)
Patent Literature 3: JP-A-2017-83815
Patent Literature 4: JP-A-2007-171858

Non-Patent Literature

Non-Patent Literature 1: Michael Morris et al., "Engineered diffusers for display and illumination systems: Design, fabrication, and applications"

SUMMARY OF INVENTION

Technical Problem

When light irradiation at a wide angle (for example, 30% or more in full angle) is intended to be achieved by a glass having a high resistance to heat or resistance to high energy light including ultraviolet rays (that is, resistance to ultraviolet light, resistance to blue-violet light, or resistance to blue light), there is a problem that the light irradiation at the wide angle is hardly achieved due to difficulty in processing, or desired optical properties (particularly, uniformity in light intensity in an irradiation plane) cannot be obtained due to low accuracy in processing.

In the case where a diffusion element with a wide diffusion angle (full angle) of 30° or more is manufactured using an aspheric lens whose lens surface has an aspheric shape, the light quantity distribution of emitted light flux is an uneven light quantity distribution which is intensive at the center and weak in the periphery (see FIG. 19A). On the other hand, in the case where a similar wide-angle diffusion element is manufactured using an aspheric lens having a lens surface of an aspheric shape such as a paraboloid, the light quantity distribution of emitted light flux can be equalized (see FIG. 19B).

In the case where a micro-lens array is used, the light quantity within incident light flux can be equalized by an array structure. However, in the case where unevenness occurs in the light quantity distribution of emitted light flux in each of lenses, unevenness also appears in the light quantity distribution of emitted light flux from the element, which results from superposition of the emitted light flux from the lenses. This problem appears more conspicuously in the case where the irradiation range has a wide angle.

When such a diffusion element capable of uniform irradiation over a wide angle range is supposed, the shape of each individual lens is preferably aspheric. However, with increase in the angle of emitted light, an inclination in a boundary portion (outermost circumferential portion) becomes an acute angle while a sag quantity also increases. For example in an aspheric lens having a diffusion angle of 30° or more, the sag quantity needs to be at least 20 μm or more.

When dry etching is used, anisotropic etching can be performed such that a surface of a substrate can be processed into an aspheric shape. Examples of processing methods include a method in which an aspheric lens array of a photoresist is formed by use of the aforementioned grayscale mask, and then dry-etched, and a method in which a resin is imprinted by use of a mold, and then dry-etched.

However, in the case where the sag quantity of each lens increases (for example, to 5 μm or more) such that the boundary portion comes to have an acute angle, accurate processing by dry etching is hardly performed. For example, in the case where a lens shape having a large sag quantity is formed by use of dry etching, there is a problem that the boundary portion which has to have an acute angle may be shaved to have an obtuse angle (see FIG. 20A and FIG. 20B). This problem is caused by the fact that a rate of processing with etching gas increases locally in an acute portion of each boundary in a lens array. FIG. 20A shows a desired aspheric shape, and FIG. 20B shows an aspheric lens shape which has been processed. The material of the lens array is a quartz glass in this case. In addition, FIG. 20B shows a concave lens array. In the case of a convex lens array, processing with etching gas cannot reach an acute portion of each boundary in the lens array. Therefore, the processing rate is reduced locally. In either case, each boundary portion with an acute angle (see a in FIG. 20B) is hardly formed accurately by dry etching.

On the other hand, etching proceeds isotropically in wet etching. Therefore, lenses other than spherical lenses cannot be formed in the case where wet etching is merely applied.

Due to such difficulty in processing, a method using a mold, an approach for transforming refractive micro-lenses to equivalent diffraction lenses, or the like, is often used for manufacturing a micro-lens array in which the sag quantity of each lens is 20 μm or more (for example, see Patent Literature 2).

Non-Patent Literature 1 describes that even an aspheric micro-lens array in which the sag quantity of each lens reaches 20 μm or more can be manufactured with high accuracy when a laser writing system is used. However, a laser writing system according to Patent Literature 1 or the like can be applied only to a diffusion element having a PoG (Polymer on Glass) configuration in which a resin concave/convex structure is formed on a glass substrate. That is, a micro-lens array cannot be formed directly on the glass substrate. Patent Literature 2 also has no disclosure about a method for processing a glass substrate directly. Therefore, it can be considered that a PoG configuration is also supposed in Patent Literature 2.

In the case of a PoG configuration, there is a problem as to resistance to heat or resistance to high energy light including ultraviolet rays in some use environment.

For example, due to requests to make an optical device smaller or thinner, a lighting module included in the optical device may be required to be thinner. As the lighting module is thinner, it is considered that a distance between a light source and a diffusion element for diffusing light from the light source in the lighting module is reduced such that the ambient environment around the diffusion element reaches a high temperature. In addition, as the light source has higher power, it is also considered that the ambient environment around the diffusion element reaches a high temperature regardless of the distance between the light source and the diffusion element. In addition, regardless of the ambient environment during operation, for example, in the case where a module having a diffusion element and a light source integrated with each other is mounted on an electronic substrate by reflow or the like, it is also considered that the ambient environment around the diffusion element reaches a high temperature in the mounting process of the device.

In addition, very severe environmental durability is required in an automobile mounted with such a lighting module. Examples of such requirements include durability of 1,000 hours at 150° C. in a high temperature test, durability of 1,000 hours at 85° C. and 85% RH in a high humidity and high temperature test, and durability of 500 cycles between −55° C. and 125° C. in a heat cycle test. In this case, the lenses are required to have not only heat resistance but also low hygroscopicity or a thermal expansion coefficient substantially as high as the material of the lighting module.

Further, light to be used is not limited to near infrared light or visible light. For example, in the case where ultraviolet light, blue-violet light or blue light is used, it is necessary to consider deterioration of optical properties caused by deterioration of optical members due to irradiation with such high energy light.

Typically, a resin material is inferior to a glass material as to resistance to heat and resistance to high energy light, and also higher in hygroscopicity. A typical diffusion element having a PoG configuration has a heat resistant temperature (maximum temperature) of about 120° C. However, borosilicate glass, which is known as a material having a small thermal expansion coefficient, has the heat resistant temperature of 200° C. or higher. The heat resistant temperature in this case designates an ordinary service temperature. Accordingly, in the case where there is a possibility that a diffusion element may be placed in such an ambient environment, it is preferable to compose the element only by a glass material high in resistance to heat or resistance to high energy light, without using any resin material.

However, the following problem arises when a micro-lens array which is aspheric and deep in sag quantity is formed directly in a surface of a glass substrate. That is, since the glass substrate is very slow in dry etching rate and is not crystalline, crystal anisotropic etching cannot be used.

For example, Patent Literature 3 describes a method in which a grayscale mask is used to process a surface of a glass substrate into a lens shape which is not spherical. However, an FWHM (Full Width at Half Maximum) corresponding to a diffusion angle (full angle) of a diffusion element is only 10° at maximum. It is considered that this is because a rate of processing with etching gas increases locally in an acute portion of each boundary in the lens array. In addition, the depth of each lens increases in order to obtain a large diffusion angle. Therefore, the processing time in a dry etching step is increased, which is unfavorable in terms of productivity.

According to a method described in Patent Literature 4, a surface of a glass substrate can be processed into an aspheric lens shape though the number of steps increases. However, anisotropic etching is used in the method described in Patent Literature 4. Thus, there is such a problem that a material is limited to quartz.

Further, the step-like shape formed in the dry etching step has to be made into a smooth aspheric shape. To this end, the quantity of processing in wet etching has to be increased. As a result, there is a problem that the diffusion angle is reduced.

In addition, the processing rate in the wet etching step of quartz is much lower than that of borosilicate glass or crown glass, which is unfavorable in terms of productivity.

In consideration of the aforementioned problems, an object of the present invention is to provide a method for processing into an aspheric lens, in which an aspheric lens capable of radiating light with a wide angle (for example, a diffusion angle (full angle) of 30° or more) can be formed with high accuracy directly in a surface of a glass substrate. Another object of the present invention is to provide, with high accuracy and high productivity, a diffusion element which can radiate light with a wide angle and is excellent in resistance to heat or resistance to ultraviolet light, and a lighting module including the diffusion element.

Solution to Problem

A method for processing into an aspheric lens in the present invention, includes: a preprocessing step of performing preprocessing on a glass substrate; and an etching step of performing wet etching on the glass substrate subjected to the preprocessing, in which the preprocessing step includes a step of irradiating a certain position of the glass substrate with a pulsed laser beam such that a partial region inside the glass substrate is modified, thereby generating a density distribution in a thickness direction at the position irradiated with the pulsed laser beam, or a step of forming a predetermined wedge-shaped concave portion in a surface of the glass substrate by use of a chemical or physical processing method.

Further, a diffusion element in the present invention includes: a glass substrate; and a plurality of concave aspheric lenses formed directly in one surface of the glass substrate, in which: the aspheric lenses are disposed closely at least in an effective region of the surface of the glass substrate; the aspheric lenses have a maximum size of µ250 µm or less; and a diffusion angle that is a spread angle of emitted light flux when parallel light is incident on the effective region from the surface where the lenses are processed is 30° or more in full angle.

Further, a lighting module in the present invention includes: a light source; a mount board on which the light source is mounted; and a window member that is disposed above the light source and has a diffusion function, in which the window member includes the diffusion element in the present invention.

Advantageous Effects of Invention

According to the present invention, it is possible to provide a method for processing into an aspheric lens, in which an aspheric lens capable of radiating light with a wide angle (for example, a diffusion angle (full angle) of 30° or more) can be formed with high accuracy directly in a surface of a glass substrate. In addition, according to the present invention, it is possible to provide, with high accuracy and high productivity, a diffusion element which can radiate light with a wide angle and is excellent in resistance to heat or resistance to ultraviolet light, and a lighting module including the diffusion element.

DESCRIPTION OF EMBODIMENTS

Embodiment 1

Examples of an embodiment of the present invention will be described below with reference to the drawings. FIG. 1A to FIG. 1D are explanatory views showing an example of a method for processing into aspheric lenses according to the embodiment. The method is, for example, used for manufacturing a diffusion element.

Figure 1A:
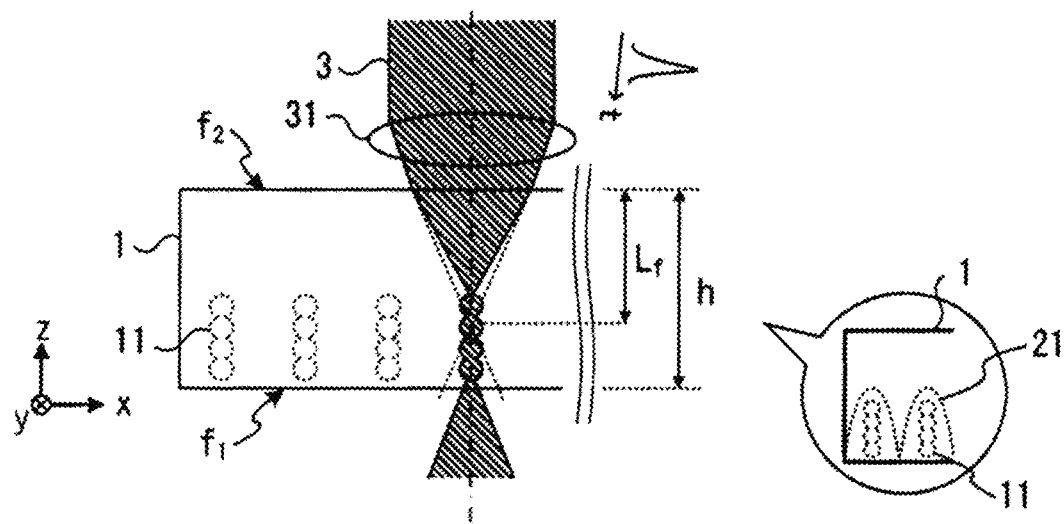
FIG. 1A to FIG. 1D are explanatory views showing an example of a method for processing into aspheric lenses according to a first embodiment.

In the example shown in FIG. 1A to FIG. 1D, a glass substrate 1 where aspheric lenses 2 are to be formed is irradiated with a high-power pulsed laser beam 3 to modify a partial region inside the glass substrate 1 (FIG. 1A: laser modification step). The pulsed laser can concentrate energy in a short time such that a higher peak output can be obtained than in a continuous-wave laser.

In the laser modification step, high-order nonlinear polarization (nonlinear optical effects such as multiphoton absorption, self-focusing, self-phase modulation, etc.) is induced in a medium of the glass substrate 1 by use of an electric field caused by intensive light radiated from the laser. The following formula (1) shows dependency of a refractive index $\eta$ on light intensity I [W/m$^2$] as a nonlinear optical effect. Here, $\eta_0$ designates a linear refractive index, $\gamma$ designates a nonlinear refractive index, and n designates an order number of nonlinear polarization. In the following description, the light intensity I will be expressed by units [W/m$^2$]. More specifically, it is assumed that the light intensity I is given by a time mean value of a pointing vector per unit area.

[Formula 1]

$$\eta(I) = \eta_0 + \Sigma_n \gamma^{(n)} I^{n-1} \qquad (1)$$

When intensive incident light enters the medium, nonlinear polarization in which light and the medium interact with each other strongly is induced into the medium by an electric field caused by the incident light, together with linear polarization. It is said that the induced nonlinear polarization is proportional to high-order terms of the electric field. Typically, even-number order terms disappear due to center symmetry in an isotropic medium such as a glass material. In the nonlinear polarization, thus, the lowest-order term provided endogenuously by the glass material is the third. A change in refractive index caused by the third nonlinear polarization is also referred to as a light Kerr effect. Here, in the case where the coefficient $\gamma$ in the formula (1) is positive, the light intensity at a center part of the beam is so high that the refractive index increases at the center part to act as a convex lens. Such action is referred to as self-focusing. When the laser beam is narrowed in the medium by the self-focusing, the intensity further increases at that part (high-density region). The glass substrate 1 is damaged in the case where the intensity exceeds a threshold value. However, by adjusting the intensity, partial regions (for example, regions (modified regions) 11 or the like enclosed by the broken lines in FIG. 1) inside the glass substrate 1 can be modified (to change the density or to generate cracks).

Strictly speaking, the principles governing the change in density have not been made clear. However, as a result of analyzing data obtained by repeated experiments, particularly phenomena (that is, anisotropy) occuring in a wet etching step after the laser modification step, it can be considered that a density distribution may occur in the process of multiphoton absorption in the aforementioned high density region in the medium. Typically, optical constants such as a refractive index, an absorption coefficient, etc. can be regarded as constants in the case where the intensity of an electric field caused by incident light is weak. However, such optical constants change depending on the light intensity in the case where the light intensity is high as in the case where the pulsed laser beam 3 is collected. Such a phenomenon is referred to as a nonlinear optical phenomenon. By use of the nonlinear optical phenomenon, even a common substance which has been transparent to weak light can absorb light locally in a region where the intensity of the light is increased. At the place where the light is absorbed, temperature increases locally due to influence of high pressure plasma caused by collision of electrons in an excited state. Thus, the temperature exceeds a glass transition point and is then cooled suddenly (because the irradiation is a pulsed beam irradiation). It is considered that a density distribution occurs inside the glass substrate 1 due to such a process.

In the laser modification step, the glass substrate 1 is irradiated with a laser beam having intensity and frequency capable of generating a density distribution inside the glass substrate 1, such that a partial region inside the glass substrate 1 is modified. More specifically, the power and the pulse width of the laser are adjusted such that a specified part in the thickness direction of the glass substrate 1 is irradiated with the laser beam with laser intensity being equal to or more than a predetermined threshold value. The power of the laser may be, for example, adjusted by injected electric power, and it is preferably 5.0 W or higher. In order to cool the glass substrate 1 suddenly after the irradiation, the pulse width is preferably 20 ps or less, and more preferably 10 ps or less. In addition, the lower limit of the pulse width is not particularly limited, but it may be, for example, 1 ps or more.

For a reference, according to data of simulation software (SimphoSOFT (registered trademark)) opened to the public by Simphotek Inc., minimum power $P_{cr}$ that can obtain self-focusing in silica is $1.836\lambda^2/(4\pi\eta_0\gamma)$, that is, about 3 MW. As shown in FIG. 1A, in this embodiment, a high-intensity electric field is created from the pulsed laser beam 3 by use of an objective lens 31. For the sake of explanation, such a region where a change in density occurs due to laser irradiation may be referred to as a modified region 11 in the following description.

The glass substrate 1 used as a target in this processing method needs to have high optical transparency to the wavelength of the pulse laser beam 3 incident thereon. For example, internal transmittance at a thickness of 10 mm is preferably 99% or higher, more preferably 99.5% or higher. If a material having a large absorption coefficient (for example, 0.00001 or more) in the wavelength of the pulsed laser beam 3 is used, a glass ablation process occurs due to heat absorption such that the aforementioned modification effect cannot be expected. In addition, nonlinear susceptibility is not particularly limited, but it is premised that properties (such as optical transparency to a used wavelength, resistance to heat, resistance to high energy light, etc.) required in a lens which has been formed are provided. The wavelength of the laser beam 3 is not particularly limited, but examples thereof include 1,026 nm, 1,064 nm, and 532 nm.

In the laser modification step, such a pulsed laser beam 3 is radiated to a position (position on xy plane) where an aspheric lens is to be formed in the surface of the glass substrate 1. For example, the pulsed laser is positioned and superimposed on a position of the optical axis of the aspheric lens, and then laser irradiation is performed. In the embodiment, the pulsed laser beam 3 is radiated from a surface $f_2$ (opposed surface) side on the opposite side to a surface $f_1$ where the aspheric lens is to be formed.

A schematic image of a positional relation between a lens surface 1 of an aspheric lens 2 to be formed and a modified region 11 is shown in a balloon of FIG. 1A. The image is merely schematic. The shape of the lens surface 21 of the aspheric lens 2 to be formed practically is determined by complex elements including the nonlinear susceptibility of the material of the glass substrate 1, the intensity and the focus position of the laser beam, and the etching time in a subsequent etching step.

On this occasion, the focus position (focus position calculated by linear optics) of the laser beam may be outside the surface $f_1$ on the opposite side to the surface on which the laser beam is incident. That is, $L_f > h$ may be satisfied, where h designates the thickness of the glass substrate 1, and $L_f$ (hereinafter, referred to as "laser focus position $L_f$") designates the distance between the indent surface ($f_2$ in FIG. 1) of the laser beam and the laser focus position calculated by linear optics. Even in such a case, the modification effect (that is, anisotropy of wet etching) has been experimentally confirmed in the glass substrate 1. The direction of the substrate to be irradiated by the laser is not limited to the aforementioned direction. It will go well if at least the modified region 11 can be generated in a region corresponding to a concave portion of a concave aspheric lens.

In the laser modification step, laser irradiation may be performed on positions where aspheric lenses 2 are intended to be formed in the surface of the glass substrate 1, in accordance with the number of the aspheric lenses 2. On this occasion, the profile (for example, the laser focus position $L_f$, the irradiation time (the pulse width and the number of shots), and the power) of the laser irradiation may be changed for each of the aspheric lenses.

The irradiation position of the laser can be adjusted by driving a movable stage on which the glass substrate 1 is put. However, the adjustment is not limited thereto. As another example of the adjustment, an optical path of the laser may be adjusted. The method may be implemented by a galvanometer mirror and a telecentric fθ lens placed on the optical path.

Figure 1B:
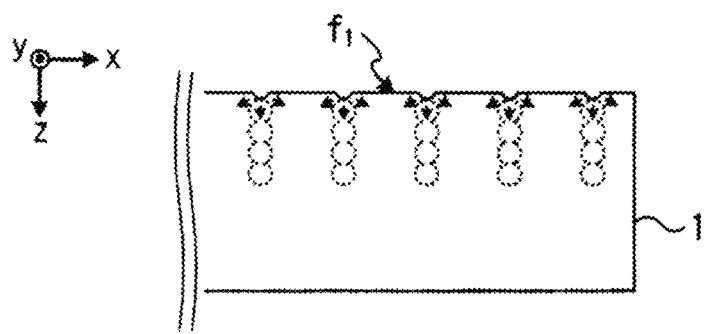
Figure 1C:
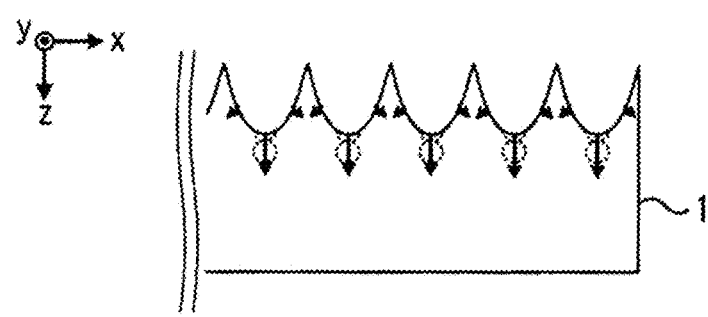

After the laser modification step is completed, wet etching is performed (FIG. 1B and FIG. 1C: etching step). In the etching step, isotropic etching may be performed for an etching time determined in advance to obtain a desired aspheric shape. The etching step may include a step of forming a mask (resist mask) with a resist pattern which has openings corresponding to the positions where the aspheric lenses 2 are to be formed. However, a good aspheric shape can be obtained even if such a mask is not formed. As a mask other than the aforementioned mask having openings, a mask to cover the other region than an effective region may be formed.

Figure 1D:
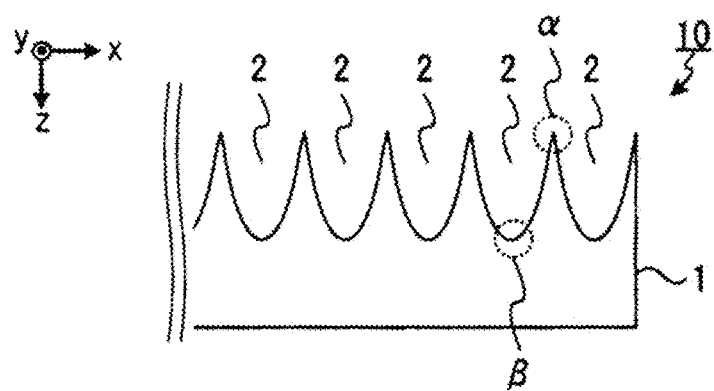
Figure 2B:
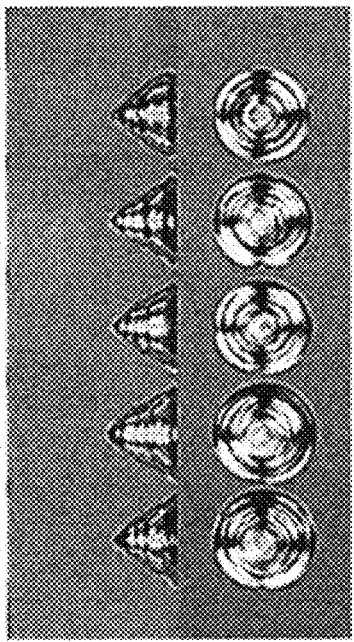
FIG. 2A to FIG. 2D are sectional views and top views of aspheric lenses 2 obtained after an etching step.
Figure 2D:
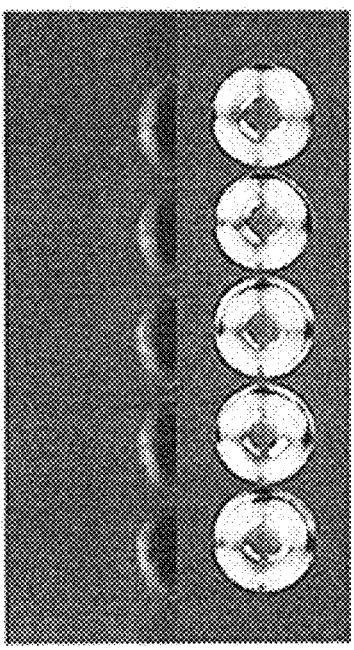
Figure 2A:
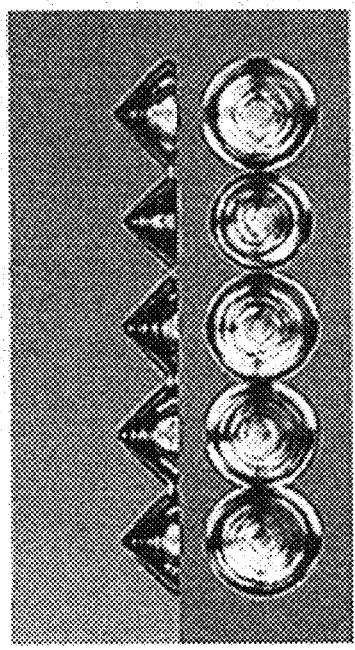
Figure 2C:
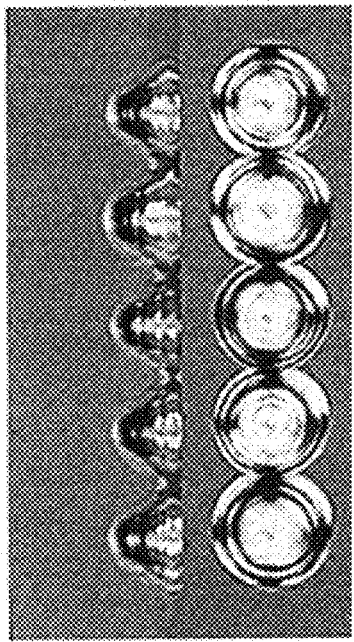

Although isotropic etching is performed in the etching step according to the embodiment, anisotropy (specifically increase in etching quantity in the thickness direction) occurs due to the modification effect in the previous laser modification step. As a result, the surface of the glass substrate 1 can be processed into an aspheric shape. In FIG. 1D, an example of a diffusion element 10 obtained in this processing method is illustrated together with an example of the aspheric lenses 2 obtained after the etching step. In the diffusion element 10 in this example, the aspheric lenses 2 are processed closely at least in the effective region of one surface of the glass substrate 1.

FIG. 2A to FIG. 2D are sectional views and top views of the aspheric lenses 2 formed in the surface of the glass substrate 1 actually after the etching step. As shown in FIG. 2A to FIG. 2D, the aspheric lenses 2 having various shapes can be formed directly in the surface of the glass substrate 1 in the processing method of the embodiment.

Figure 3:
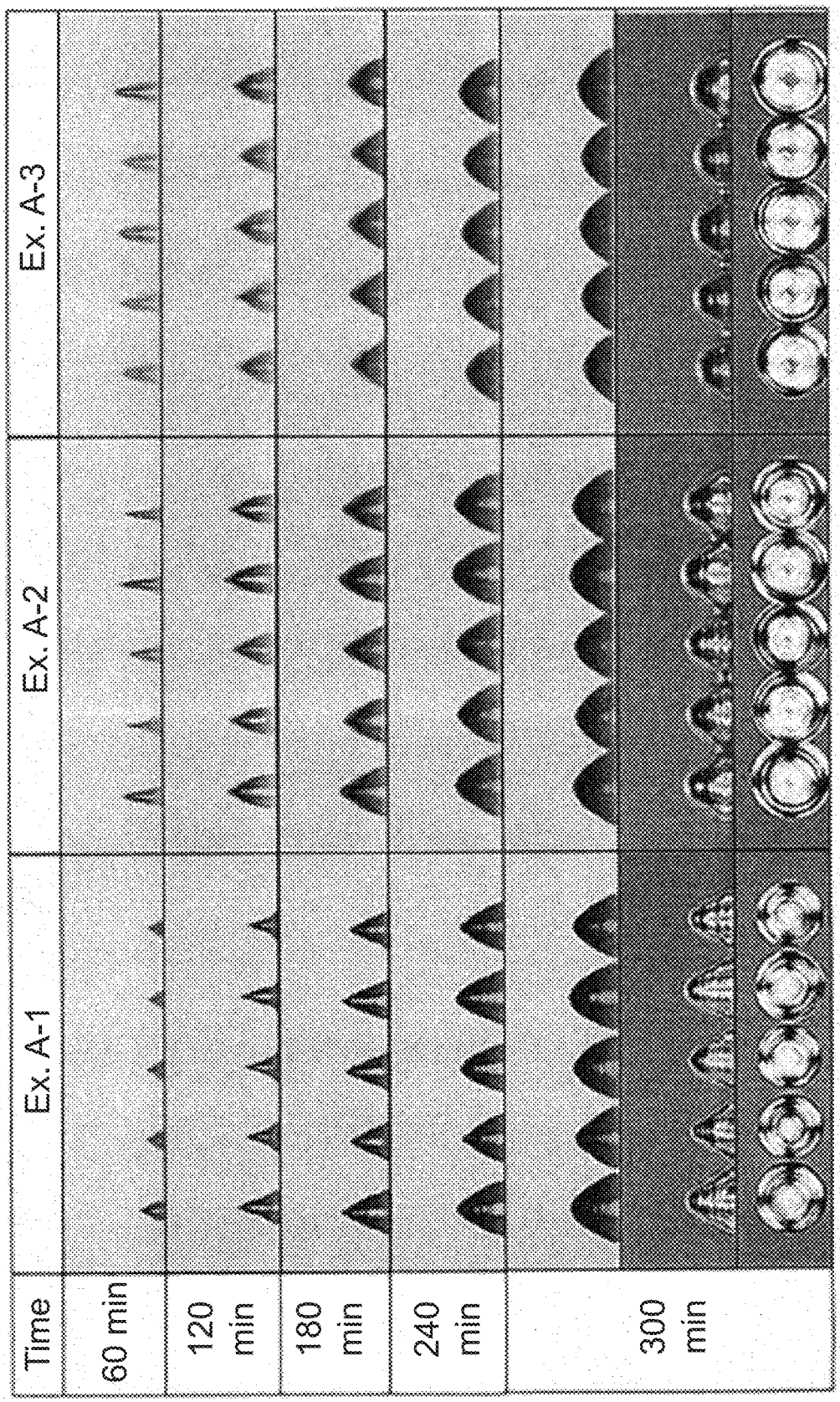
FIG. 3 is explanatory views showing process dependency in a process of etching.
Figure 4:
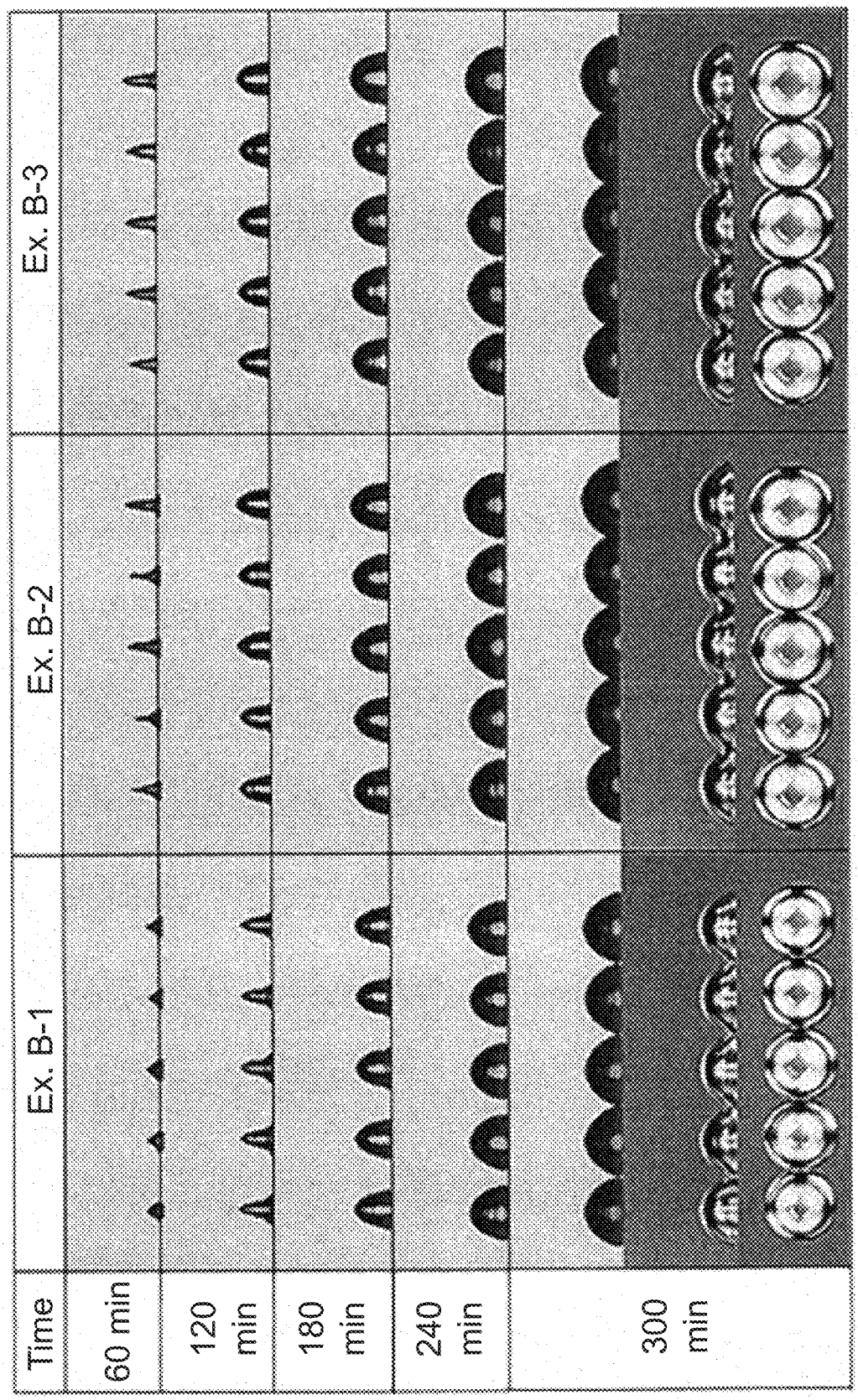
FIG. 4 is explanatory views showing the process dependency in the process of etching.
Figure 5A:
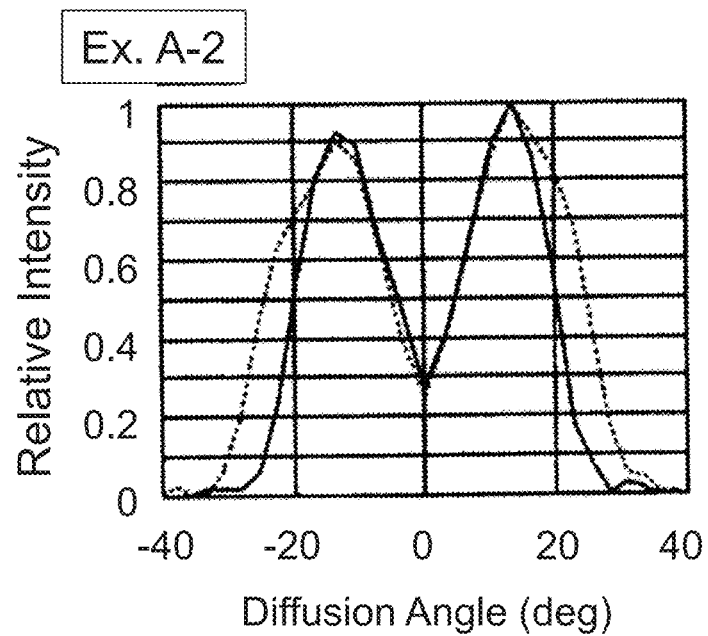
FIG. 5A to FIG. 5E are graphs showing measurement results of light distribution characteristics in Examples A-2 to A-6 of diffusion elements 10 each including a plurality of aspheric lenses 2 obtained by the processing method according to the first embodiment.
Figure 5B:
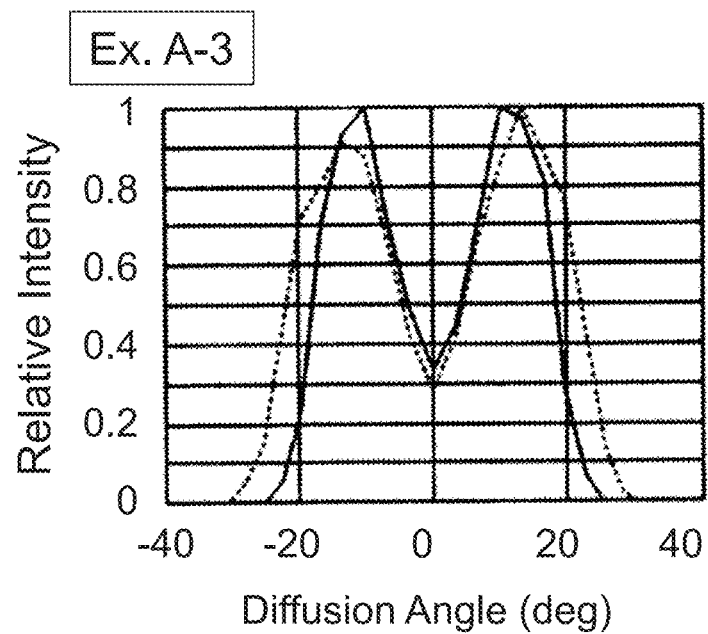
Figure 5C:
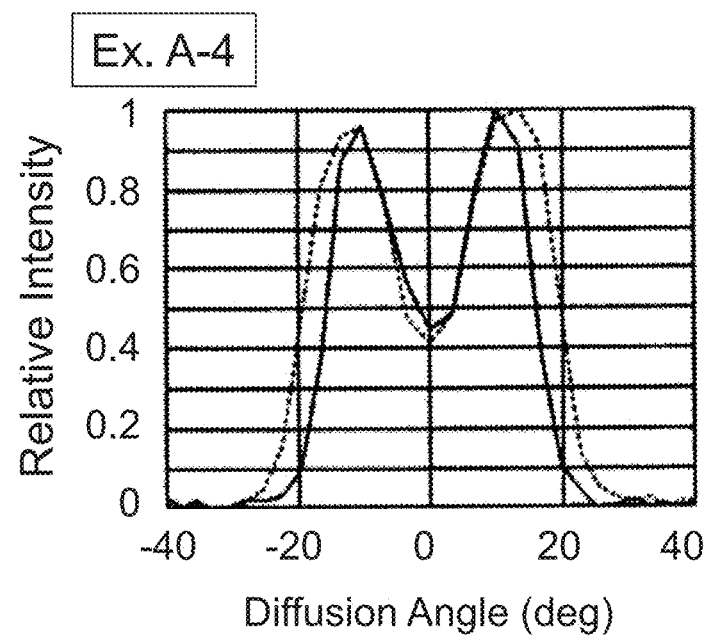
Figure 5D:
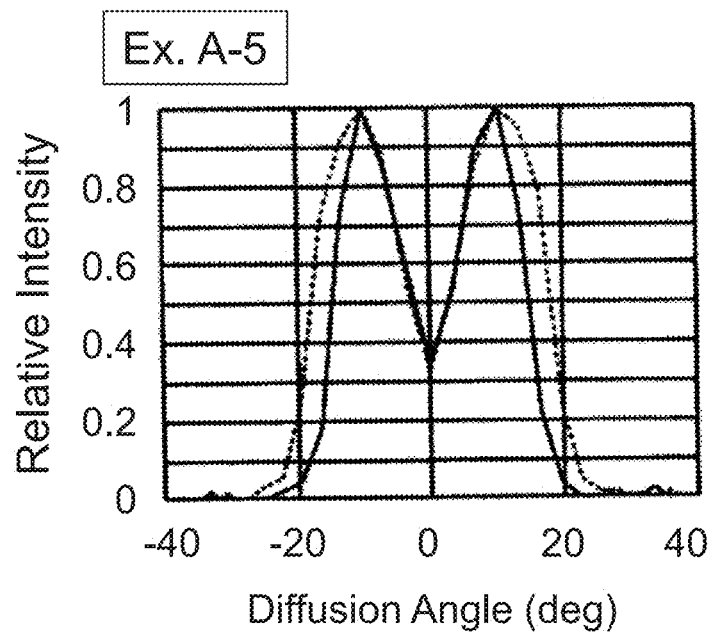
Figure 5E:
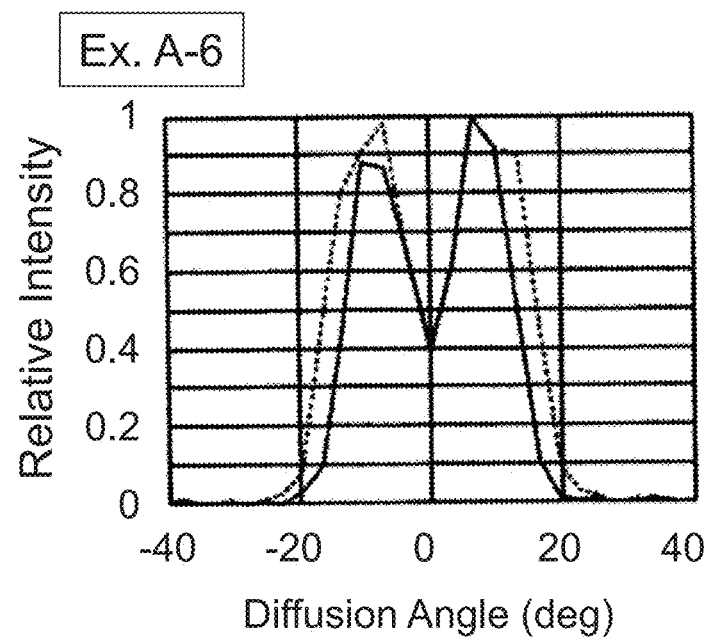
Figure 6A:
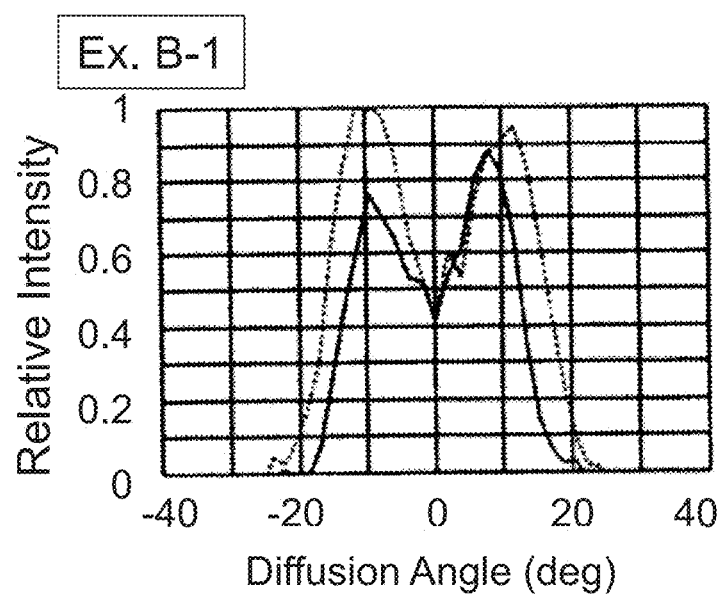
FIG. 6A to FIG. 6F are graphs showing measurement results of light distribution characteristics in Examples B-1 to B-6 of diffusion elements 10 each including a plurality of aspheric lenses 2 obtained by the processing method according to the first embodiment.
Figure 6B:
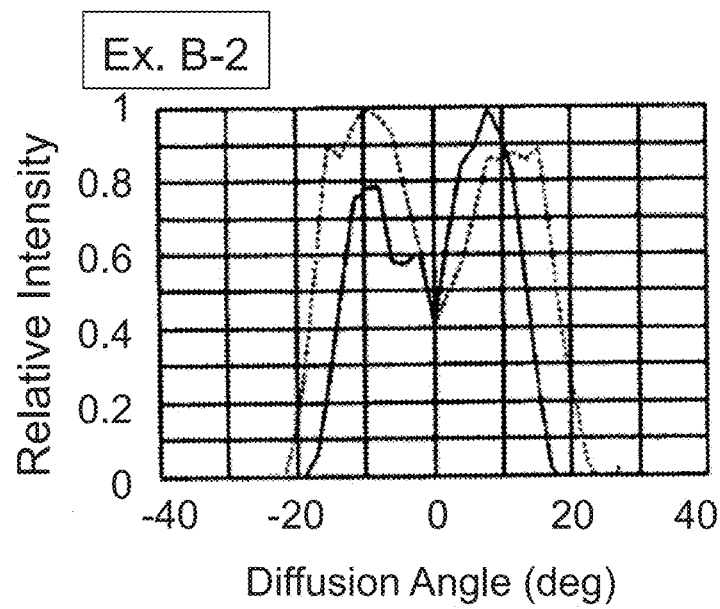
Figure 6C:
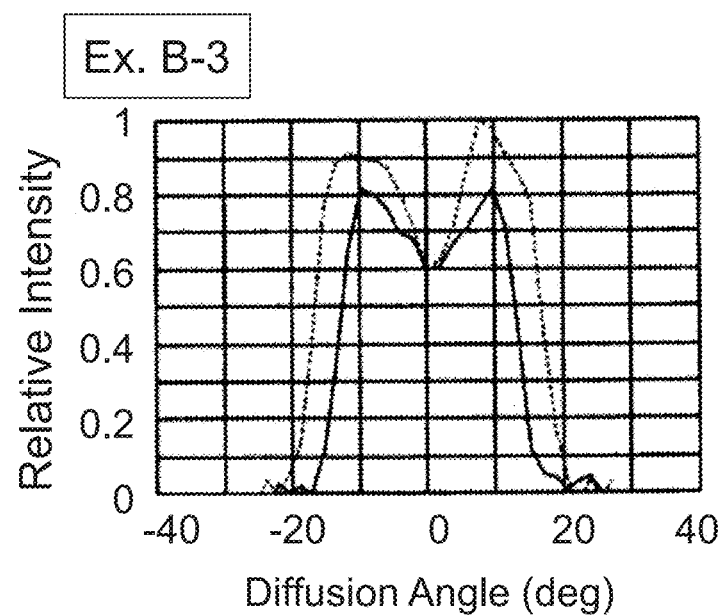
Figure 6D:
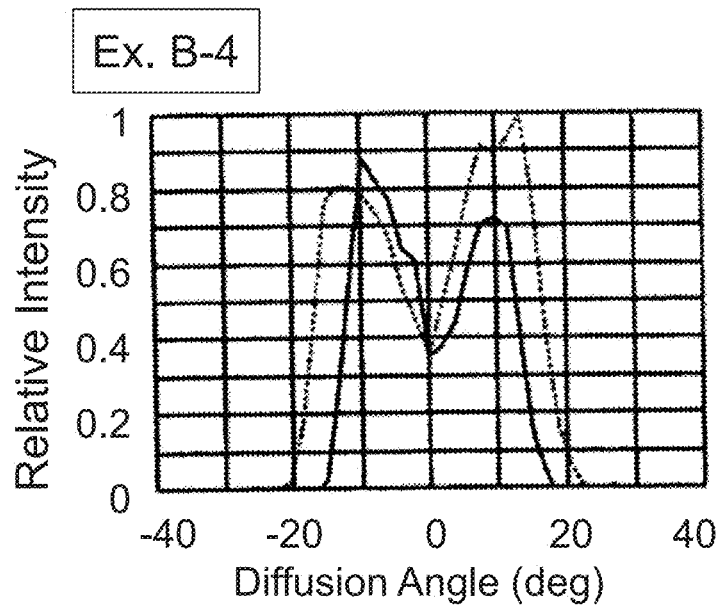
Figure 6E:
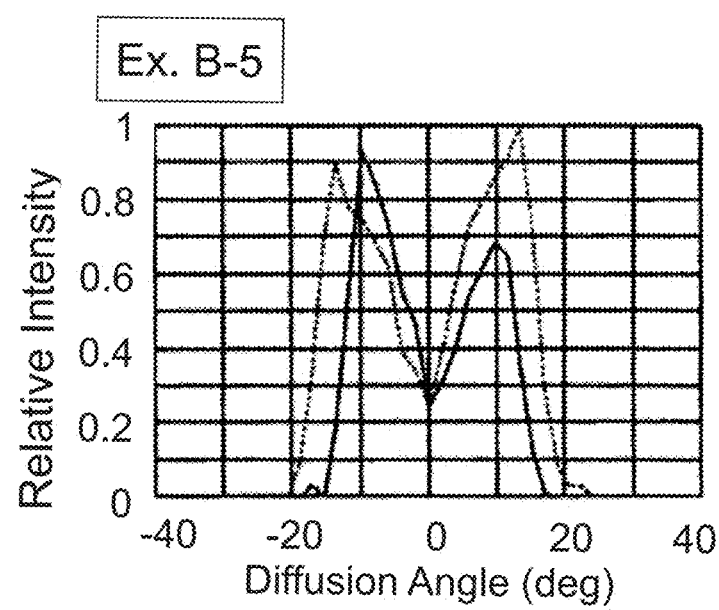
Figure 6F:
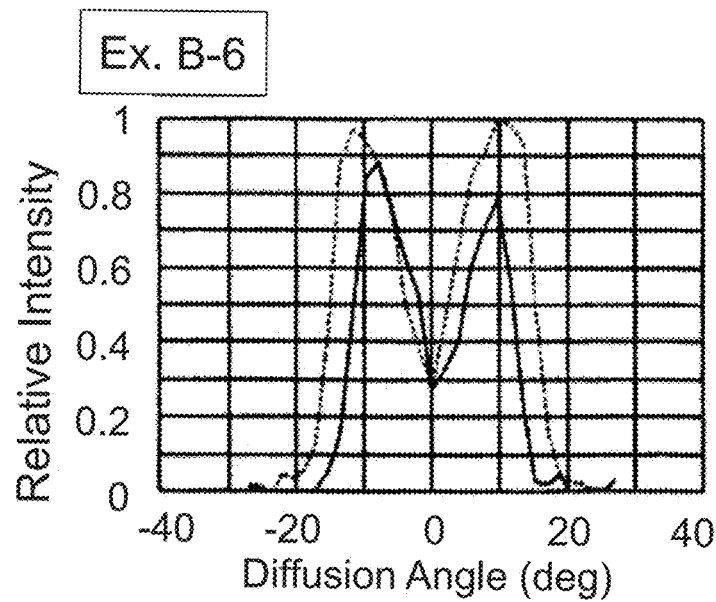

In addition, FIG. 3 and FIG. 4 show process dependency (particularly, etching behavior with respect to the laser focus position $L_f$) in the process of etching. FIG. 3 shows etching results of laser modification on three examples (Example A-1 to A-3) in which the glass substrate 1 having a thickness of 1 mm was irradiated with one shot of the pulsed laser beam 3 having a pulse width of 10 ps, a frequency of 75 kHz, a wavelength of 1,026 nm and a power of 5.25 W through the objective lens 31 having a magnification of 5 times correspondingly to each of the positions where the aspheric lenses 2 are to be formed. In Examples A-1 to A-3, the laser focus position $L_f$ with respect to a position corresponding to each of the aspheric lenses was set at +1.025 mm, +1.050 mm and +1.075 mm respectively. On the other hand, FIG. 4 shows etching results of laser modification on three examples (Example B-1 to B-3) in which the glass substrate 1 having a thickness of 1 mm was irradiated with the same laser beam as the aforementioned one through the objective lens 31 having a magnification of 10 times. In Examples B-1 to B-3, the laser focus position $L_f$ with respect to a position corresponding to each of the aspheric lenses was set at +0.75 mm, +0.76 mm and +0.77 mm respectively. Each example used, as a design example, a diffusion element in which aspheric lenses each having a diffusion angle (full angle) around 70° were arranged at a pitch $P_x$=100 μm in an X-direction and a pitch $P_y$=80 μm in a Y-direction. In addition, a borosilicate glass D263 Teco made by Schott AG was used as the glass substrate 1. The glass material has the following technical data.

Surface roughness: less than 1 nm RMS

Luminous transmittance TvD65 (t=1.1 mm): 91.7%

Coefficient of mean linear thermal expansion: $7.2 \times 10^{-6} K^{-1}$

Glass transition temperature Tg: 557° C.

Dielectric constant ε, at 1 MHz: 6.7

D-line refractive index $n_D$: 1.5230

Density ρ (annealed at 40° C./h): 2.51 g/cm$^3$

The glass material used in the glass substrate 1 is not limited to the aforementioned borosilicate glass. For example, Tempax or Pyrex (registered trademark) having heat resistance, crown glass such as B270i, quartz, etc. may be used.

As shown in FIG. 3, for example, in Example A-1, aspheric lenses 2 were obtained by isotropic etching for about 300 minutes. In addition, in Examples A-2 and A-3, aspheric lenses 2 were obtained by isotropic etching for about 240 to 300 minutes. Further, as shown in FIG. 4, in Examples B-1 to B-3, aspheric lenses 2 were obtained by isotropic etching for about 240 to 300 minutes.

As understood from the examples shown in FIG. 2A to FIG. 2D, FIG. 3 and FIG. 4, slight steps forming a multistage concentric ripple pattern were confirmed in front view in the lens surface of each aspheric lens 2 obtained by the processing method of the embodiment. However, any step was at an unproblematic level.

Some measurement results as to light distribution characteristics in the aspheric lenses obtained by the processing method of the embodiment will be shown below.

FIG. 5A to FIG. 5E are graphs showing measurement results of light distribution characteristics in Examples A-2 to A-6 of diffusion elements 10 each including a plurality of aspheric lenses 2 obtained by the aforementioned processing method. Each of Examples A-2 to A-6 is an example of the diffusion element 10 obtained by etching after laser modification by irradiation with a pulsed laser beam through an objective lens having a magnification of 5 times. In Examples A-4 to A-6, the laser focus position $L_f$ with respect to a position corresponding to each of the aspheric lenses was set at +1.100 mm, +1.125 mm and +1.150 mm respectively. The other points are the same as those in Examples B-1 to B-3. In each of FIG. 5A to FIG. 5E, a light intensity distribution in sectional view in the y-axis direction at the position of x=0 (center) is illustrated by a solid line, and a light intensity distribution in sectional view in the x-axis direction at the position of y=0 (center) is illustrated by a broken line.

Table 1 shows measurement results of a diffusion angle and center intensity in an irradiation plane in each of Example A-2 to Example A-6. The center intensity is normalized by highest intensity (maximum intensity) in the light intensity distribution in the predetermined irradiation plane. Table 1 also shows, in addition to the measurement results of Examples A-2 to A-6, measurement results of Examples A-2' to A-6' which are examples where each of the same places was irradiated with two shots of a pulse laser beam having the same profile as those in Examples A-2 to A-6. In each example, the etching time was set at 300 minutes.

TABLE 1

| (one-shot irradiation) | | Example A-2 | Example A-3 | Example A-4 | Example A-5 | Example A-6 |
|---|---|---|---|---|---|---|
| | Lf [mm] | 1.050 | 1.075 | 1.100 | 1.125 | 1.150 |
| diffusion angle [°] | X-direction | 49.3 | 44.1 | 39.8 | 36.3 | 32.7 |
| | Y-direction | 40.4 | 36.4 | 31.8 | 29.7 | 26.2 |
| | diagonal | 55.2 | 50.6 | 45.7 | 42.9 | 38.9 |
| | center intensity | 0.261 | 0.312 | 0.430 | 0.334 | 0.396 |
| (two-shot irradiation) | | Example A-2' | Example A-3' | Example A-4' | Example A-5' | Example A-6' |
| | Lf [mm] | 1.050 | 1.075 | 1.100 | 1.125 | 1.150 |
| diffusion angle [°] | X-direction | 49.3 | 44.1 | 39.8 | 36.3 | 32.7 |
| | Y-direction | 40.4 | 36.4 | 31.8 | 29.7 | 26.2 |
| | diagonal | 55.2 | 50.6 | 45.7 | 42.9 | 38.9 |
| | center intensity | 0.261 | 0.312 | 0.430 | 0.334 | 0.396 |

On the other hand, FIG. 6A to FIG. 6F are graphs showing measurement results of light distribution characteristics in Examples B-1 to B-6 of diffusion elements 10 each including a plurality of aspheric lenses 2 obtained by the aforementioned processing method. Each of examples B-1' to B-6' is an example of the diffusion element 10 obtained by etching after laser modification based on irradiation with two shots (corresponding to two pulses) of a pulsed laser beam for each of the same places through an objective lens having a magnification of 10 times. In Examples B-1' to B-6', the laser focus position $L_f$ with respect to a position corresponding to each of the aspheric lenses was set at +0.750 mm, +0.760 mm, +0.770 mm, +0.780 mm, +0.790 mm and +0.800 mm respectively. Incidentally, the other points are the same as those in Examples B-1 to B-3. Incidentally, in each of FIG. 6A to FIG. 6F, a light intensity distribution in sectional view in the y-axis direction at the position of x=0 (center) is illustrated by a solid line, and a light intensity distribution in sectional view in the x-axis direction at the position of y=0 (center) is illustrated by a broken line.

Table 2 shows measurement results of a diffusion angle and center intensity in an irradiation plane in each of Example B-1' to Example B-6'. The center intensity here is normalized by highest intensity (maximum intensity) in the light intensity distribution in the predetermined irradiation plane. Table 2 also shows, in addition to the measurement results of Examples B-1' to B-6', measurement results of Examples B-1 to B-6 which are examples where irradiation was performed by only one shot of a pulse laser beam having the same profile as those in Examples B-1' to B-6'. In each example, the etching time was set at 180 minutes.

TABLE 2

| (one-shot irradiation) | | Example B-1 | Example B-2 | Example B-3 | Example B-4 | Example B-5 | Example B-6 |
|---|---|---|---|---|---|---|---|
| | Lf [mm] | 0.750 | 0.760 | 0.770 | 0.780 | 0.790 | 0.800 |
| diffusion angle [°] | X-direction | 34.1 | 38.5 | 37.5 | 36.2 | 32.4 | 31.1 |
| | Y-direction | 25.3 | 28.5 | 29.7 | 28.5 | 24.9 | 23.7 |
| | diagonal | 39.5 | 43.9 | 43.7 | 42.4 | 38.1 | 36.7 |
| | center intensity | 0.380 | 0.508 | 0.413 | 0.212 | 0.142 | 0.367 |
| (two-shot irradiation) | | Example B-1' | Example B-2' | Example B-3' | Example B-4' | Example B-5' | Example B-6' |
| | Lf [mm] | 0.750 | 0.760 | 0.770 | 0.780 | 0.790 | 0.800 |
| diffusion angle [°] | X-direction | 32.5 | 35.6 | 33.2 | 33.2 | 32.4 | 30.3 |
| | Y-direction | 25.3 | 27.0 | 25.4 | 24.7 | 24.4 | 23.4 |
| | diagonal | 38.4 | 41.3 | 38.9 | 38.7 | 38.0 | 36.0 |
| | center intensity | 0.413 | 0.410 | 0.599 | 0.350 | 0.244 | 0.273 |

Figure 7A:
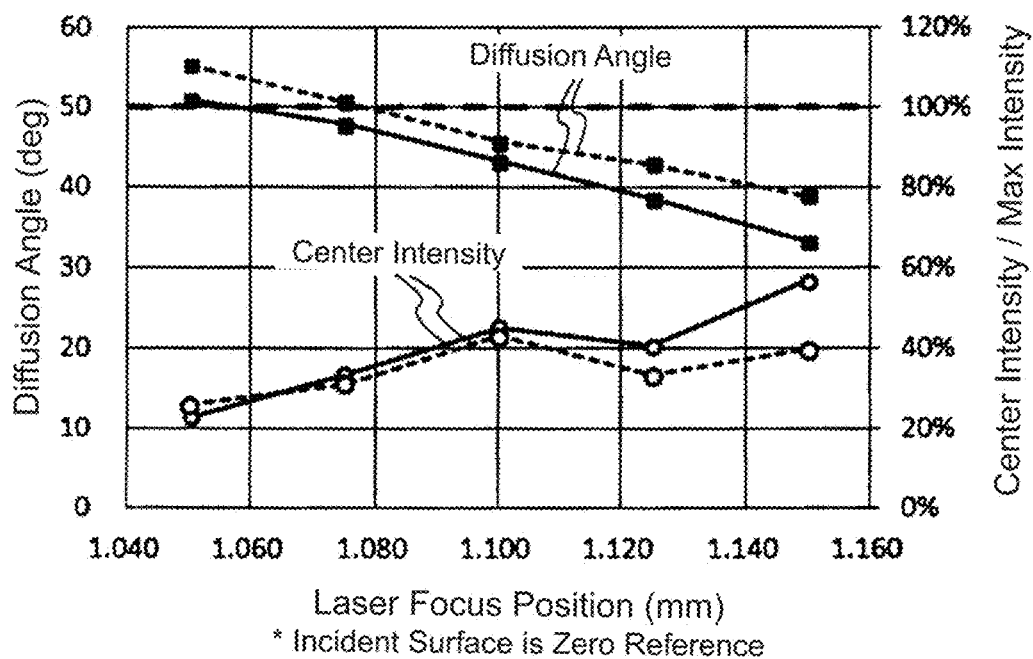
FIG. 7A is a graph showing a relation among a laser focus position $L_f$, a diffusion angle and a center intensity in each of examples shown in Table 1.
Figure 7B:
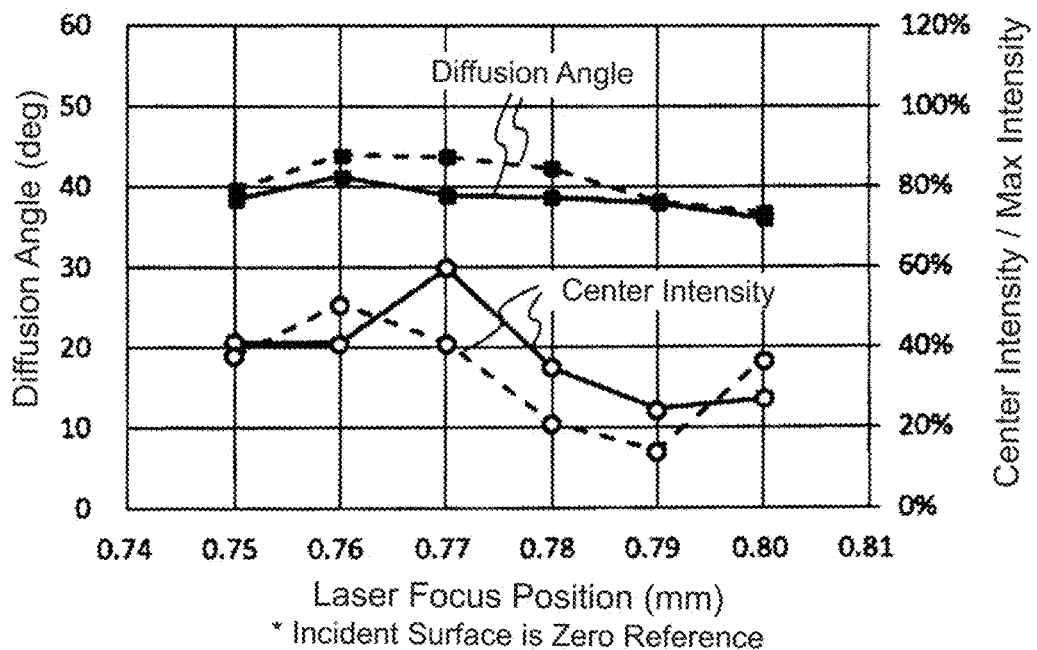
FIG. 7B is a graph showing a relation among a laser focus position $L_f$, a diffusion angle and a center intensity in each of examples shown in Table 2.

In addition, FIG. 7A and FIG. 7B show a relationship among a laser focus position $L_f$, a diffusion angle and a center intensity in each of the examples shown in Table 1 and Table 2. FIG. 7A is a graph showing a relationship among a laser focus position $L_f$, a diffusion angle and a center intensity in each of examples shown in Table 1. In FIG. 7A, the broken lines show the measurement results of Examples A-2 to A-6 where laser modification was performed by one shot of pulse irradiation, and the solid lines show the measure results of Examples A-2' to A-6' where laser modification was performed by two shots of pulse irradiation. As shown in FIG. 7A, it is understood that the diffusion angle tends to be narrowed as the laser focus position $L_f$ increases. In addition, it is understood that the center intensity tends to increase (that is, the recess at the center of each of the graphs in FIG. 5A to FIG. 5E tends to be shallower) as the laser focus position $L_f$ increases. The effect of irradiation with pulses at the same place was not observed.

FIG. 7B is a graph showing a relationship among a laser focus position $L_f$, a diffusion angle and a center intensity in each of the examples shown in Table 2. In FIG. 7B, the broken lines show the measurement results of Examples B-1 to B-6 where laser modification was performed by one shot of pulse irradiation, and the solid lines show the measure results of Examples B-1' to B-6' where laser modification was performed by two shots of pulse irradiation. In the examples shown in FIG. 7B, no dependency on the laser focus position $L_f$ was observed with respect to the diffusion angle and the center intensity. In those examples, a shift of the laser focus position $L_f$ with respect to the center intensity (tendency showing the property of the laser focus position $L_f$ at a smaller value than in the case of one-shot pulse irradiation) was observed as the effect of two shots of pulse irradiation at the same place.

Figure 8:
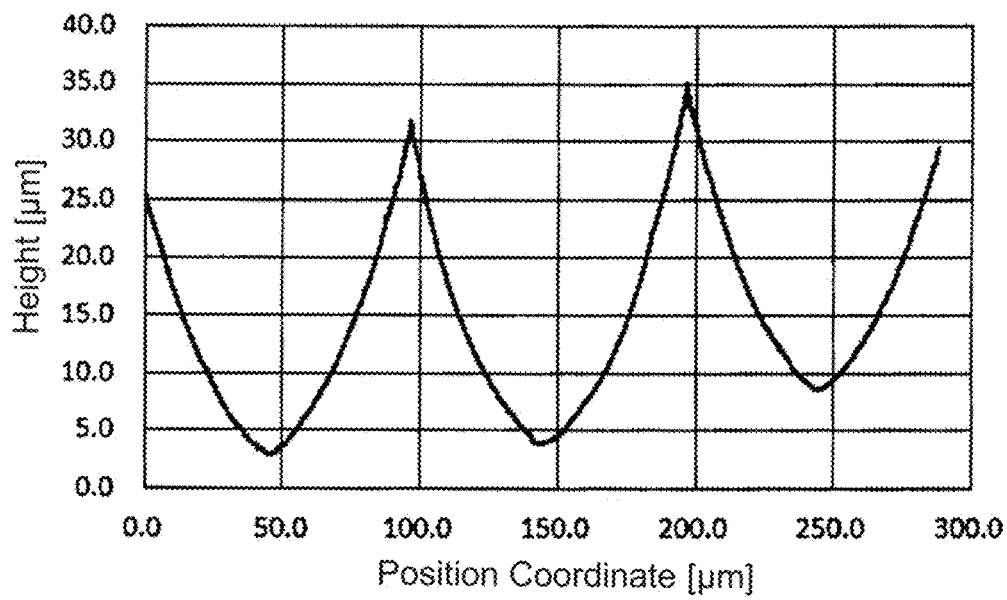
FIG. 8 is a graph showing a sectional shape of the aspheric lenses 2 obtained by the processing method according to the first embodiment.

In addition, a micro-lens array constituted by a plurality of aspheric lenses 2 obtained by the aforementioned processing method is characterized in that the property of an acute angle in each boundary portion (see a in FIG. 1D) can be maintained (see FIGS. 3, 4, 8, etc.) in comparison with that in a micro-lens array constituted by a plurality of aspheric lenses obtained by anisotropic etching such as dry etching. FIG. 8 is a graph showing a sectional shape of the aspheric lenses 2 obtained by the aforementioned processing method. For example, according to results of experiments of dry etching performed on actual glass substrates, it was observed that each boundary portion among actual lenses obtained after processing tended to have an obtuse angle in the case where the inclination angle (maximum inclination angle) in the boundary portion at design reached 29.1° or more. On the other hand, according to the processing method of the embodiment, processing with high accuracy was able to be attained even in the case where the maximum inclination angle was 40 to 60°. In this manner, according to the processing method, aspheric lenses having maximum inclination angles of 30° or more can be formed by use of wet etching. Those maximum inclination angles are also effective in micro-lenses having a maximum lens size of 250 pm or less. For example, in the example shown in FIG. 8, a maximum inclination angle of 68° is attained in a micro-lens array in which each lens has a size of about 100 μm. The maximum inclination angle is not particularly limited, but it is preferably 70° or less. This is because it is difficult to design an antireflection film on the micro-lens array if the inclination angle exceeds 70°. In addition, the fabrication tolerance of the aspheric shape of the micro-lens array becomes severe. Further, the size of each lens is preferably 20 μm or more in terms of processing tolerance in wet etching.

In addition, the aspheric lenses 2 obtained by the aforementioned processing method are also characterized in that a flat portion is not formed in a bottom portion (see β in FIG. 1D) or the flat portion is small even if formed (see FIG. 3, FIG. 4, etc.), as compared with aspheric lenses obtained by isotropic etching such as wet etching performed after step-like initial holes or the like are formed.

Due to the aforementioned characteristics, by use of the processing method of the embodiment, it is possible to obtain a diffusion element 10 in which irradiation over a wide range (for example, a diffusion angle of 30° or more) with a light quantity distribution in which the center intensity is comparatively controlled can be attained, rather than a light quantity distribution which is so uneven that the center intensity is conspicuously higher than the light intensity in the periphery.

Figure 9:
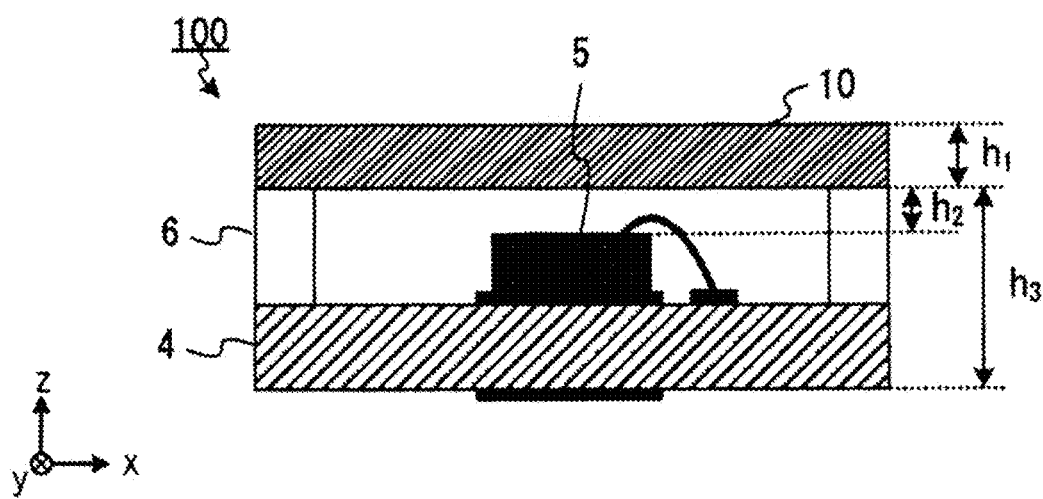
FIG. 9 is a configuration view showing an example of a lighting module 100 using a diffusion element 10 obtained by the processing method according to the first embodiment.

In addition, FIG. 9 is a configuration view showing an example of the lighting module 100 using the diffusion element 10 obtained by the processing method of the embodiment. According to the processing method of the embodiment, a plurality of aspheric lenses 2 each having a shape close to a paraboloid and having a curvature radius R capable of attaining a diffusion angle of 30° or more can be processed closely in at least an effective region directly in a surface of the glass substrate 1. Accordingly, for example, the diffusion element 10 can be applied to a window member of the lighting module 100 as a window member excellent in heat resistance as shown in FIG. 9. In the case where the window member has high heat resistance, for example, the distance between a light source 5 and the diffusion element 10 as the window member can be reduced such that the lighting module can be reduced in profile. For example, even the illustrated configuration where about $h_1=0.3$ mm, $h_2=0.3$ mm and $h_3=1$ mm can be achieved. Further, due to the high heat resistance in the window member, it is also possible to meet demands for assembling the lighting module 100 by reflow in a supply destination.

By way of example, the lighting module 100 including a VCSEL (Vertical Cavity Surface Emitting Laser) array 3.5 mm square as the light source 5 is assumed. In the lighting module 100 configured thus, the diffusion element 10 is required to have a diffusion angle of 30° or more and a lens array pitch of about 100 μm or less (estimated at an incident beam diameter of about 1 mm), and have resistance to heat in reflow. A conic coefficient of the diffusion element 10 is preferably around −1 in order to equalize the intensity distribution. According to the processing method of the embodiment, such a diffusion element 10 can be obtained easily and with high accuracy. The resistance to heat in reflow can be provided sufficiently in an ordinary glass material.

On this occasion, the diffusion element 10 may have a configuration in which a plurality of aspheric lenses 2 each having a paraboloidal shape are forme closely and directly in the surface of the glass substrate 1. In this case, as to the lens shape of each aspheric lens 2, an RMS (root mean square) value of a shape difference is preferably 0.1 μm or less when it is fitted to a shape where k=−1 in the following formula (2). In the following description, such a shape, that is, a shape in which the RMS value of the shape difference from the shape where k=−1 is 0.1 μm or less will be also referred to as paraboloid. In addition, in the following description, such an RMS value of a shape difference from an aspheric formula of a desired shape may be referred to as profile irregularity of an aspheric lens.

[Formula 2]
$$z = \frac{r^2/R}{1 + \sqrt{1 - (1+k)r^2/R^2}} \quad (2)$$

In formula (2), z designates a sag quantity of a lens, r designates a radial distance from an optical axis, R designates a curvature radius, and k designates a conic coefficient. Formula (2) corresponds to a general aspheric formula in which all of aspheric high-order coefficients are set at 0. In this case, formula (2) obtains a hyperboloid at the conic coefficient k<−1, a paraboloid at k=−1, an ellipse at −1<k<0 or k>0, and a sphere at k=0. In the case where a desired shape is a paraboloid, it will go well if each aspheric lens 2 has a shape whose conic coefficient satisfies k=−1 in formula (2).

In the case where the aspheric coefficient is not zero as the measurement result of the actual lens shape, the shape of the lens surface is fitted by formula (2).

Further, the diffusion element 10 has preferably a thermal expansion coefficient not largely different from a mount board 4 or a frame material 6. The thermal expansion coefficient is, for example, preferably about $(70\pm10)\times10^{-7}$ [/K] at 0 to 300° C. Accordingly, in addition to the aforementioned conditions, a glass substrate having a thermal expansion coefficient within the aforementioned range is preferably selected as the glass substrate 1 of the diffusion element 10 to be applied to the window member of the light module 100. In addition, in the case where a diffusion element 10 having a lens array of concave lenses is used as the window member in the lighting module 100, and particularly where the diffusion element 10 is operated as a wide-angle diffuser, it is preferable to mount the diffusion element 10 such that the lens formation surface ($f_1$ in FIG. 1A to FIG. 1D) faces downward (that is, on the light incident side).

Embodiment 2

Next, examples of a second embodiment of the present invention will be described. In the first embodiment, a part of the etching process has been described with reference to FIG. 3 and FIG. 4. In the case where aspheric lenses 2 each having a surface close to a paraboloid were obtained as a result of etching, it was confirmed that each shape formed by the etching was formed like a wedge in the etching process (for example, around the time when the etching time reached 120 to 180 minutes in Examples A-1 to A-3, or around the time when the etching time reached 60 to 120 minutes in Examples B-1 to B-3).

Figure 10A:
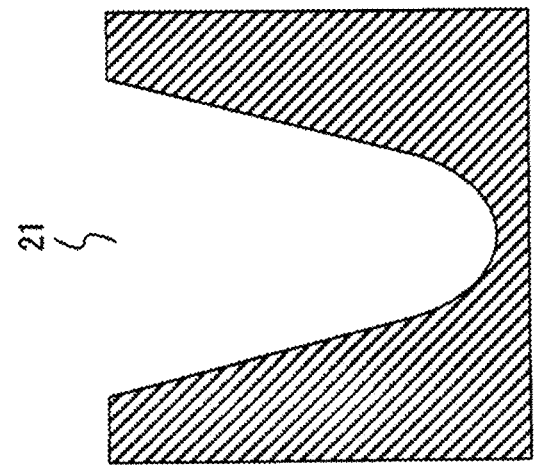
FIG. 10A to FIG. 10C are explanatory views showing the outline of a design concept according to a second embodiment.
Figure 10B:
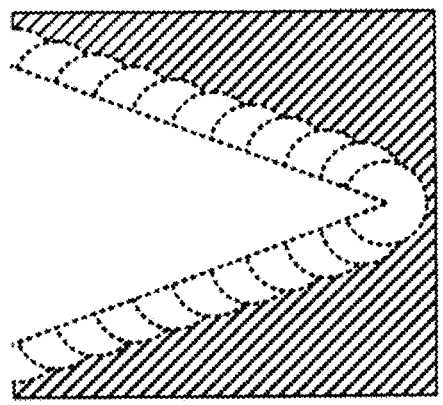
Figure 10C:
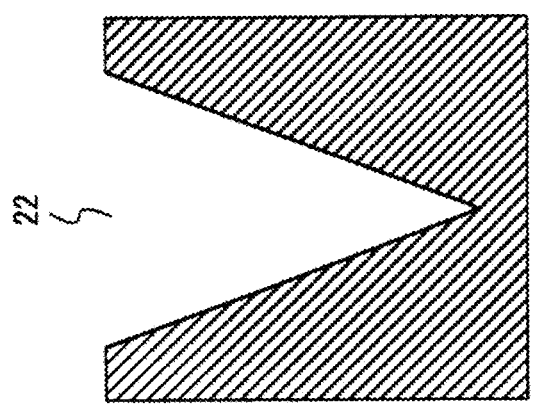

FIG. 10A to FIG. 10C are explanatory views showing the outline of a design concept according to the second embodiment. FIG. 10A shows an example of a paraboloidal shape as a desired aspheric shape. Now, it is considered that isotropic etching is reversed from the desired aspheric shape shown in FIG. 10A. FIG. 10B shows a state in which isotropic etching is reversed from the desired aspheric shape. As a result, a wedge-shaped concave portion 22 can be obtained as shown in FIG. 10C. FIG. 10A to FIG. 10C show that the desired aspheric shape can be obtained if the surface of the glass substrate 1 is processed into the wedge-shaped concave portion 22.

Figure 11A:
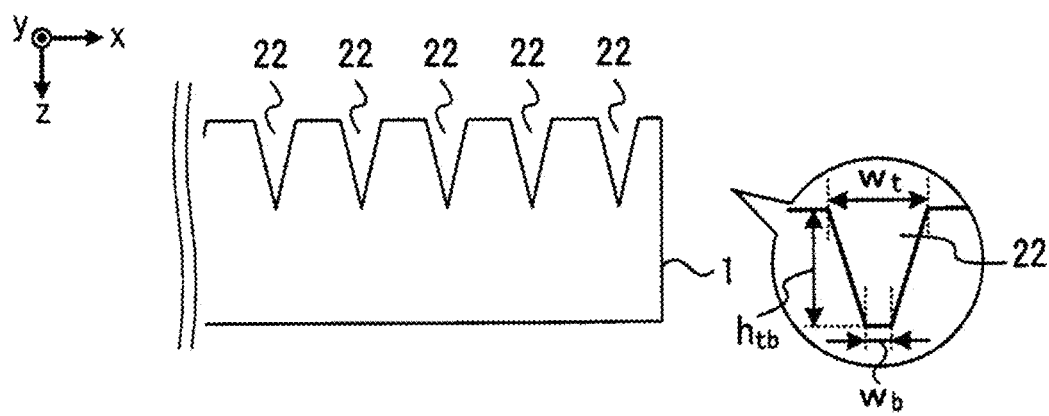
FIG. 11A to FIG. 11C are explanatory views showing an example of a method for processing aspheric lenses according to a second embodiment.
Figure 11B:
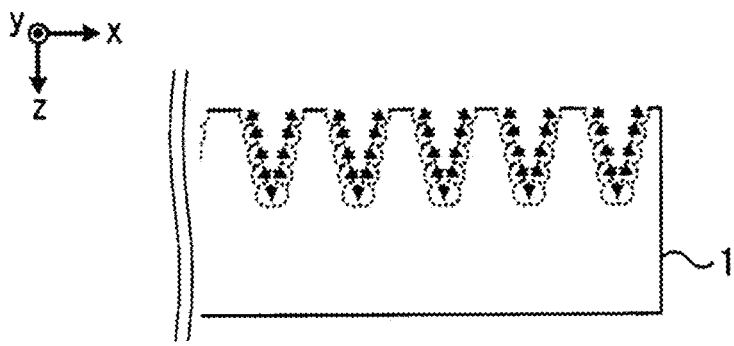
Figure 11C:
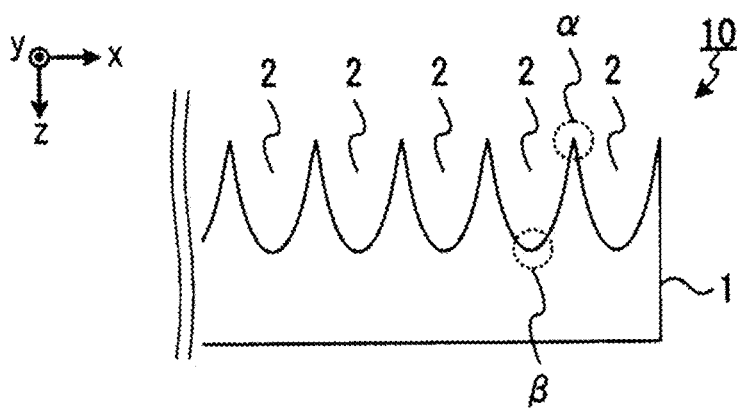

FIG. 11A to FIG. 11C are explanatory views showing an example of a method for processing into aspheric lenses according to the embodiment. In the processing method of the embodiment, based on the aforementioned design concept, wedge-shaped concave portions 22 obtained by reversing the isotropic etching process from the desired aspheric shape are first formed in the surface of the glass substrate 1 (FIG. 11A: wedge shape processing step). Here, the wedge shape of each concave portion 22 is preferably a shape having a sharp tip like a V-shape. However, the wedge shape may be any shape as long as the upper end serving as an opening portion in the surface of the glass substrate 1 is wide and the shape is gradually narrowed as goes downward. On this occasion, as shown in a balloon of FIG. 11A, the tip portion serving as the lower end of the concave portion 22 may include a flat portion substantially parallel with the substrate surface. However, a width Wb of the flat portion is preferably 2 μm or less.

In addition, the concave portion 22 is preferably formed into a wedge shape in which a conic coefficient k' obtained by fitting the shape to formula (2) is smaller than the value of the conic coefficient k of the aspheric lens 2 to be formed finally. Here, the conic coefficient k of the aspheric lens may be a value of the surface shape of the lens surface 21 of the desired aspheric lens 2 fitted to Formula (2). By way of example, in the case where the shape of the lens surface 21 of the desired aspheric lens 2 is a paraboloid (conic coefficient k=−1), it is preferable that the concave portion 22 is formed into a wedge shape in which the conic coefficient k' obtained by fitting the shape of the concave portion 22 to Formula (2) satisfies k'<−1. This is because, by wet etching in a subsequent stage, the inclination of the aspheric lens 2 after processing becomes smoother (more obtuse) than the inclination of the wedge shape.

Also in the wedge shape processing step, concave portions 22 are formed in positions where the aspheric lenses 2 are to be formed in the surface of the glass substrate 1, in accordance with the number of the aspheric lenses 2 to be formed on the surface of the glass substrate 1. On this occasion, the profile with which each wedge shape is formed may be changed for each formation position depending on the shape of the lens surface 21 of the corresponding aspheric lens 2.

After the wedge shape processing step is completed, wet etching is performed (FIG. 11B: etching step). In the etching step, it will go well if isotropic etching is performed for an etching time determined in advance to obtain each desired aspheric shape.

FIG. 11C shows an example of the aspheric lenses 2 obtained after the etching step of the embodiment, and shows an example of the diffusion element 10 in which a plurality of aspheric lenses 2 are formed closely on one surface of the glass substrate 1.

In this manner, aspheric lenses 2 having various shapes can be also obtained by this embodiment. Particularly, as long as a desired wedge shape can be obtained in each concave portion 22, high shape accuracy can be obtained in each aspheric lens 2 obtained finally.

Examples of the method for processing the glass substrate 1 into wedge shapes include the following methods.
Sandblasting (micro-blasting)
Half-cut dicing
Dry etching
Drilling By use of sandblasting, three-dimensional fine processing can be performed based on the principles of brittle fracture caused by blasting of abrasive grains. For example, a resist pattern mask having openings corresponding to positions where the wedge-shaped concave portions 22 are to be formed is formed on the surface of the glass substrate 1, and the abrasive gains are then blasted against the surface of the glass substrate 1 to be formed, at a high velocity by use of compressed air. Thus, fine processing is performed.

On this occasion, in order to improve the sharpness of the wedge shape (make the tip more acute), the size (grain size) of the abrasive grains is preferably 20 µm or less, more preferably 10 µm or less. However, this is not limited thereto in some materials of the glass substrate 1. In addition, although it is more preferable that the abrasive grains are smaller, the grain size is preferably 1 µm or more in terms of availability.

In the wedge shape processing step using sandblasting, a desired wedge shape can be obtained by adjusting the processing time (blasting time), the air pressure, the resist hole diameter, the blasting position (for example, concentrated at the tip), etc. as well as the size of the abrasive grains.

Figure 12A:
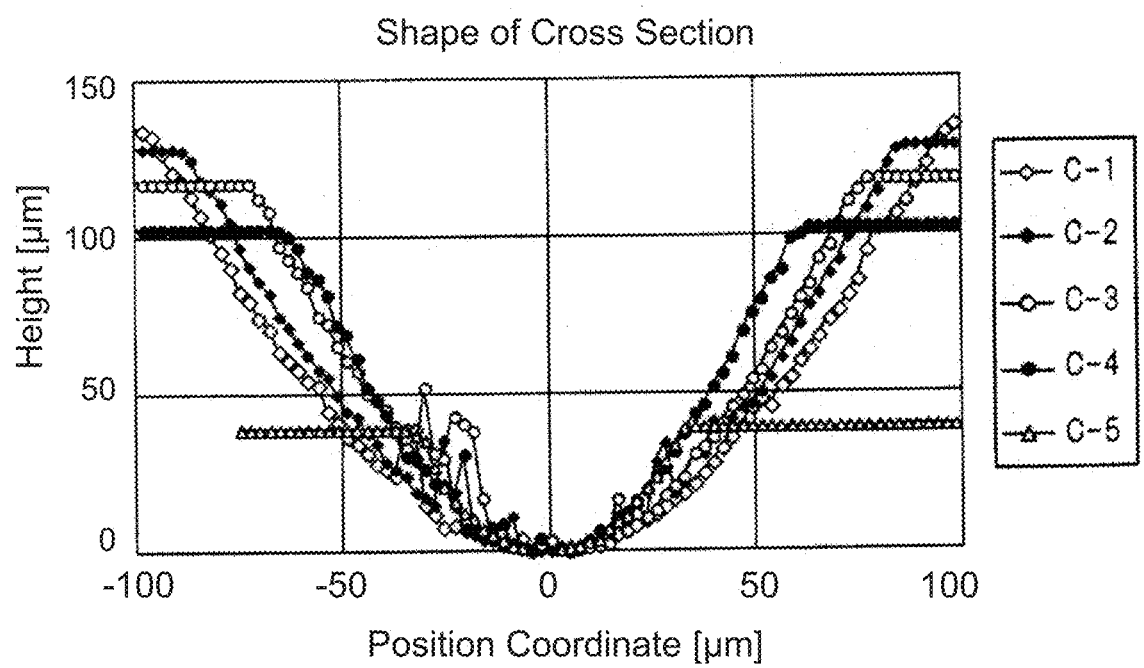
FIG. 12A is a graph showing examples of processing results in a wedge shape processing step using sandblasting.

FIG. 12A is a graph showing an example of a processing result in the wedge shape processing step using sandblasting. FIG. 12A shows sectional shapes of concave portions 22 obtained as a result of blasting in five Examples C-1 to C-5 where the processing conditions in the blasting were changed. The processing conditions in each Example are shown in Table 3.

including a plurality of aspheric lenses 2 obtained by wet etching after the wedge shape processing step using sandblasting. As shown in FIG. 13B, the diffusion element 10 in this example has a diffusion angle of about 50° though the center intensity is higher than that in other regions. Thus, wide-angle diffusion can be attained.

Typically, the degree of freedom in a shape to be formed is so high in sandblasting that the degree of freedom in design of a diffusion angle can be increased. For example, in the case where a concave portion 22 is formed by sandblasting, a wide-angle lens surface shape with a diffusion angle (full angle) of 50° or more in each of the X-direction and the Y-direction in an aspherical lens 2 after etching can be formed easily. In addition, for example, a sharp wedge-shaped concave portion 22 with an aspect ratio (ratio $h_tb/w_t$ of depth $h_{tb}$ to a diameter $w_t$ of an opening portion) of 2 or more can be formed. Further, sandblasting has a merit that a raw material to be processed is not limited because it is a physical processing method such as rubbing or shaving.

The half-cut dicing is a processing method in which the glass substrate 1 is not cut to its lower surface but nicked when the surface of the glass substrate 1 is cut by use of a dicing blade. The wedge-shaped concave portions 22 can be formed even by use of such a half-cut technique using a dicing blade.

In the method for processing a wedge shape using dry etching, for example, the dry etching is performed using a

TABLE 3

| | | Example C-1 | Example C-2 | Example C-3 | Example C-4 | Example C-5 |
|---|---|---|---|---|---|---|
| grain size [µm] | | 14 | 14 | 14 | 14 | 14 |
| blasting time [min] | | 30 | 30 | 30 | 30 | 30 |
| resist hole diameter [µm] | | 160 | 140 | 120 | 100 | 80 |
| wedge shape | depth [µm] | 135.8 | 128.9 | 118.3 | 102.8 | 39.8 |
| | opening portion [µm] | 201.1 | 175.4 | 149.7 | 126.3 | 67.8 |

Figure 12B:
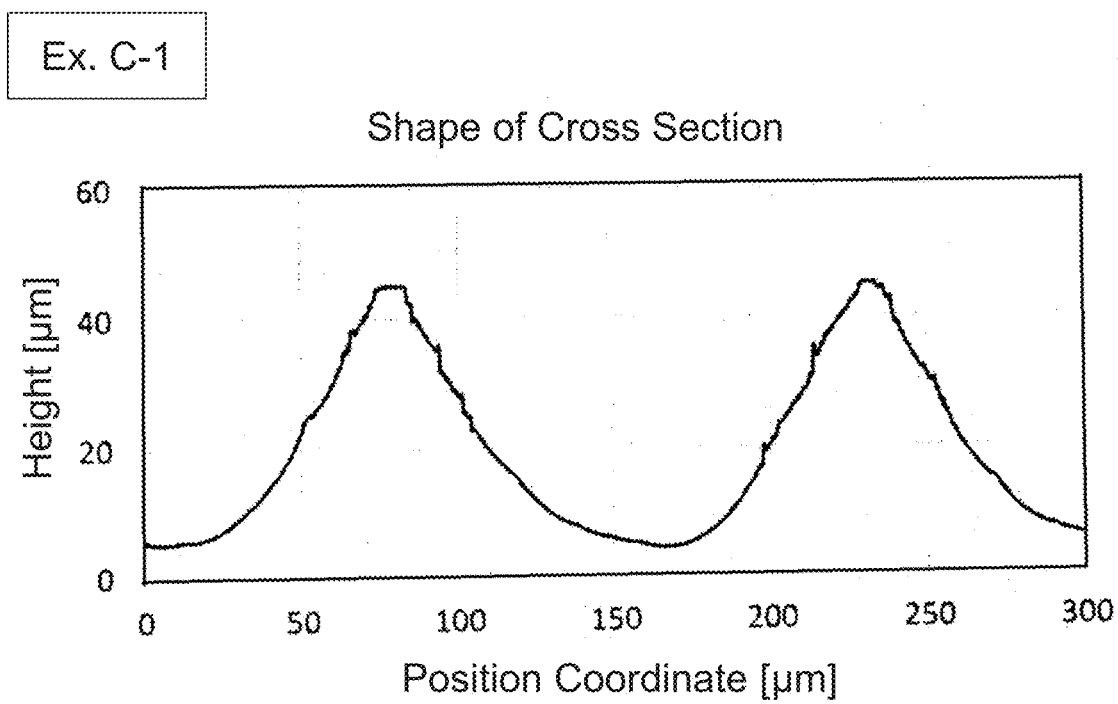
FIG. 12B is a graph showing sectional shapes of aspheric lenses 2 obtained by wet etching after the wedge shape processing step using the sandblasting.

On the other hand, FIG. 12B is a graph showing sectional shapes of aspheric lenses 2 (more specifically, a plurality of aspheric lenses 2 constituting a concave lens array on the glass substrate 1) obtained by wet etching after the wedge shape processing step using the sandblasting. In the examples shown in FIG. 12B, it is understood that a region with an inclination made gentler is observed in a lens bottom portion, but the property of the acute angle in each boundary portion is kept good. In the case where the inclination in the lens bottom portion is made into an obtuse angle, light radiated to the obtuse portion is hardly diffused. It is therefore considered that the intensity in the center region of the irradiation plane becomes higher than that in other regions (see FIG. 13B which will be described later). If the center intensity causes a problem, a measure to prevent the angle from being obtuse may be taken such that the sharpness in the tip portion can be prevented from being reduced when each concave portion 22 is formed. For example, abrasive grains to be blasted toward the tip portion may be increased to increase the degree of concentration of the abrasive grains.

Figure 13A:
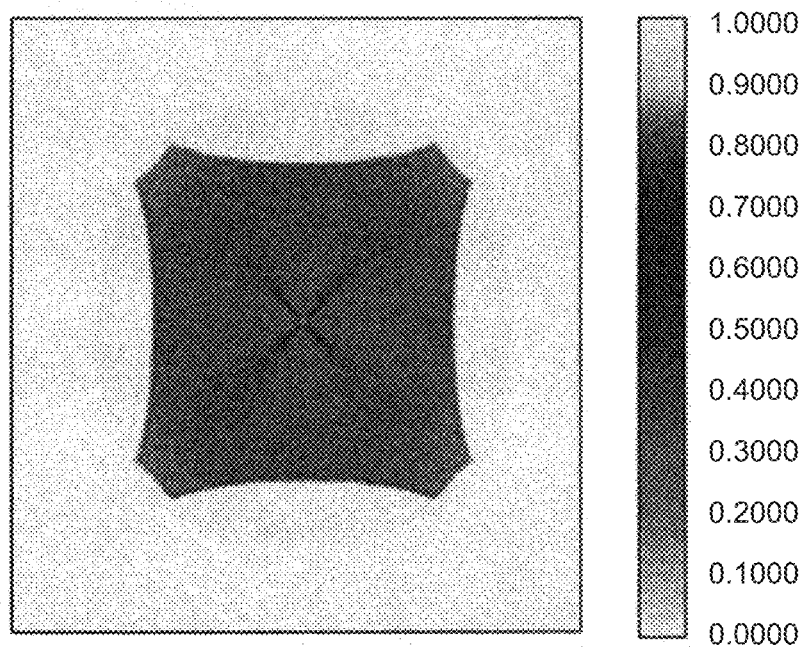
FIG. 13A and FIG. 13B are graphs showing a light intensity distribution in a certain plane irradiated with light by a diffusion element 10 obtained by the wet etching after the wedge shape processing step using the sandblasting.
Figure 13B:
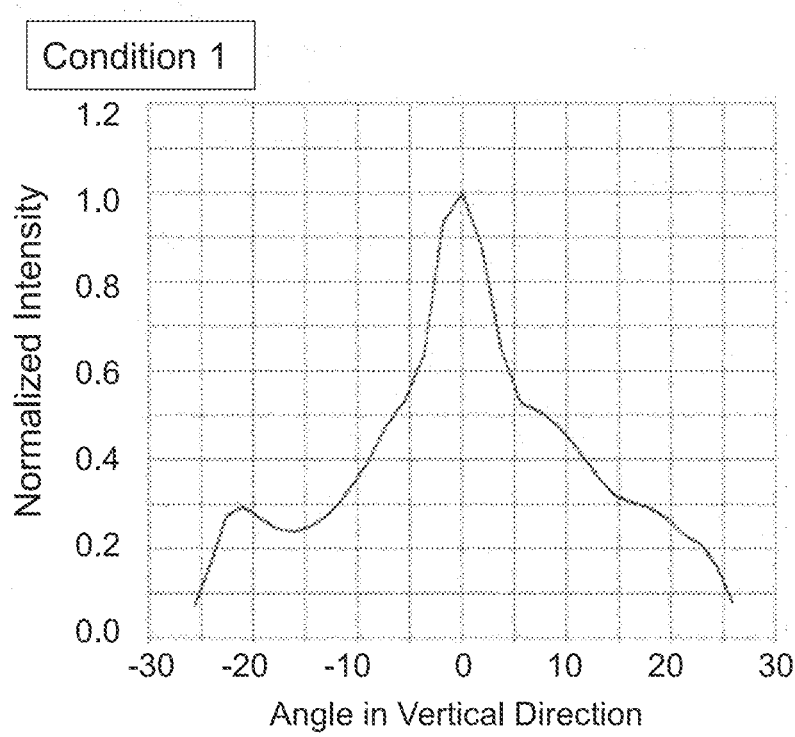

In addition, FIG. 13A is a graph showing a light intensity distribution in a certain irradiation plane when parallel light is incident on a diffusion element 10 obtained by wet etching after the wedge shape processing step using sandblasting, and FIG. 13B is a graph showing measurement results of light intensity in one axis direction (Y-axis direction) in the irradiation plane. Here, more specifically, the diffusion element 10 is a diffusion element 10 made of glass and grayscale mask such that the wedge shape can be formed. In the case where an aspheric lens 2 is formed by dry etching, the shape accuracy deteriorates. For example, the inclination of the aspheric lens 2 near the boundary portion with the substrate surface or another adjacent aspheric lens 2 is made into an obtuse angle. However, in the case where a wedge-shaped concave portion 22 is first formed by dry etching and then processed into an aspheric lens 2 by wet etching, the aspheric lens 2 can be formed with high shape accuracy.

The drilling is a method for cutting the surface of the glass substrate 1 by use of a drill with a sharp tip. A wedge-shaped concave portion 22 for some aspheric lens size can be formed even by the drilling.

As described above, a diffusion element 10 capable of irradiation over a wide range (for example, a diffusion angle of 30° or more) can be also obtained directly in the surface of the glass substrate 1 by the processing method according to the embodiment. In addition, the obtained diffusion element 10 can be applied to the aforementioned window member of the light module 100 shown in FIG. 9 such that a similar effect to that of the first embodiment can be obtained.

In each of the aforementioned embodiments, the method including the laser modification step and the method including the wedge shape processing step are shown as separate processing methods. However, each of the two steps may be regarded as a step for forming wedge-shaped concave portions 22 in a surface of a glass substrate 1 during wet etching or in a previous stage thereof.

That is, the method for processing into aspherical lenses according to the present invention includes two main steps which are a preprocessing step and an etching step to be performed after the preprocessing step. The method is characterized in that laser modification is performed on a glass substrate 1 or a predetermined wedge-shaped concave portion is formed in a surface of the glass substrate in the preprocessing step using a chemical or physical processing method, such that a predetermined wedge-shaped concave can be generated in the surface of the glass substrate when the etching step is being performed after the preprocessing step or before the etching step is started. Further, in the case where a plurality of aspheric lenses are formed in a surface of a glass substrate, the preprocessing may be performed in a plurality of positions corresponding to positions where the aspheric lenses are to be formed in the surface of the glass substrate.

EXAMPLES

Next, the aforementioned embodiments will be described more specifically using examples. Examples 1-1 to 1-25 described below are examples of diffusion elements 10 obtained by use of the processing method of the first embodiment. The diffusion element 10 in each Example has a configuration in which a concave lens array constituted by a plurality of concave aspheric lenses 2 is formed directly in one surface of a glass substrate 1, as shown in FIG. 1D.

Table 4 shows different processing conditions in each example and results of fitting performed on one aspheric lens 2 of the diffusion element 10 in the example.

XYZ-directions. On this occasion, a laser can radiate a beam to any position on the stage from above. The glass substrate 1 on the stage was irradiated in a grid at equal intervals in the X-direction and the Y-direction. The laser beam used for the irradiation had the following profile. That is, it was a pulsed laser beam having a wavelength of 1,026 nm, a pulse width of 10 ps, and a repetition frequency of 75 kHz.

The aforementioned laser beam was incident on an objective lens such that the electric field intensity of the laser beam was increased only in a specified portion in the thickness direction of the glass. A lens having a magnification of 5 times or 10 times was used as the objective lens. As for the power of the laser beam in each example, injected electric power was adjusted to generate a multiphoton absorption process (more specifically a process where a density distribution was formed inside the substrate 1 due to the multiphoton absorption process). In the profile in each example, the output of the laser beam was 5.25 W. The other irradiation conditions (focus position $L_f$ and lens magnification) in each example are shown in the aforementioned Table 4.

One shot of irradiation with such a pulsed laser beam was performed on each of positions where aspheric lenses 2 were to be formed in the glass substrate 1, and the glass substrate 1 was put into a 5% hydrofluoric acid solution to perform wet etching. On this occasion, the hydrofluoric acid was set at 25° C., and stirred by a magnet stirrer to minimize a concentration distribution in the etching solution. The processing rate on the glass substrate 1 which had not been modified was 0.39 μm/min.

TABLE 4

| | lens magnification | focus position $L_f$ [mm] | processing pitch [μm] | | number of processing | | etching time [min] | fitting results | |
|---|---|---|---|---|---|---|---|---|---|
| | | | $P_x$ | $P_y$ | $N_x$ | $N_y$ | | R [mm] | k |
| Ex. 1-1 | ×5 | 1.050 | 68 | 85 | 59 | 47 | 244 | 0.010 | −1.7 |
| Ex. 1-2 | ×5 | 1.075 | 68 | 85 | 59 | 47 | 244 | 0.022 | −1.6 |
| Ex. 1-3 | ×5 | 1.025 | 71 | 88.75 | 57 | 45 | 301 | 0.019 | −1.5 |
| Ex. 1-4 | ×5 | 1.050 | 80 | 100 | 50 | 40 | 301 | 0.029 | −1.2 |
| Ex. 1-5 | ×5 | 1.075 | 80 | 100 | 50 | 40 | 301 | 0.043 | −1.0 |
| Ex. 1-6 | ×10 | 0.790 | 24.8 | 31 | 160 | 127 | 68 | 0.005 | −2.5 |
| Ex. 1-7 | ×10 | 0.800 | 24.8 | 31 | 160 | 127 | 68 | 0.010 | −2.2 |
| Ex. 1-8 | ×10 | 0.810 | 24 | 30 | 165 | 131 | 68 | 0.013 | −2.1 |
| Ex. 1-9 | ×10 | 0.820 | 24 | 30 | 165 | 131 | 68 | 0.015 | −2.1 |
| Ex. 1-10 | ×10 | 0.830 | 24 | 30 | 165 | 131 | 68 | 0.014 | −2.0 |
| Ex. 1-11 | ×10 | 0.770 | 36 | 45 | 110 | 88 | 126 | 0.021 | −1.3 |
| Ex. 1-12 | ×10 | 0.780 | 44 | 55 | 91 | 72 | 126 | 0.022 | −1.5 |
| Ex. 1-13 | ×10 | 0.790 | 44 | 55 | 91 | 72 | 126 | 0.020 | −1.9 |
| Ex. 1-14 | ×10 | 0.800 | 43 | 53.75 | 93 | 74 | 126 | 0.028 | −1.8 |
| Ex. 1-15 | ×10 | 0.730 | 28.8 | 36 | 138 | 110 | 186 | 0.012 | −1.8 |
| Ex. 1-16 | ×10 | 0.740 | 36 | 45 | 110 | 88 | 186 | 0.016 | −1.8 |
| Ex. 1-17 | ×10 | 0.750 | 39 | 48.75 | 102 | 81 | 186 | 0.021 | −1.7 |
| Ex. 1-18 | ×10 | 0.760 | 48.8 | 61 | 82 | 65 | 186 | 0.033 | −1.4 |
| Ex. 1-19 | ×10 | 0.710 | 46 | 57.5 | 87 | 69 | 244 | 0.036 | −0.8 |
| Ex. 1-20 | ×10 | 0.720 | 48.8 | 61 | 82 | 65 | 244 | 0.022 | −2.0 |
| Ex. 1-21 | ×10 | 0.730 | 50 | 62.5 | 80 | 64 | 244 | 0.025 | −1.5 |
| Ex. 1-22 | ×10 | 0.740 | 52 | 65 | 77 | 61 | 244 | 0.035 | −1.2 |
| Ex. 1-23 | ×10 | 0.710 | 64.8 | 81 | 62 | 50 | 301 | 0.051 | −1.0 |
| Ex. 1-24 | ×10 | 0.720 | 68 | 85 | 59 | 47 | 301 | 0.053 | −0.8 |
| Ex. 1-25 | ×10 | 0.730 | 72 | 90 | 56 | 45 | 301 | 0.053 | −0.8 |

The diffusion element 10 in each example was manufactured as follows. First, a double-surface polished substrate formed to have a thickness of 1 mm by borosilicate glass D263 Teco made by Schott AG and a size of about 3 cm square was prepared as the glass substrate 1. Next, the glass substrate 1 was set on a stage which could be driven in After a lapse of a predetermined etching time, the glass substrate 1 was extracted to obtain the diffusion element 10 in each example. It is considered that the density of the glass material is reduced at a place which has been irradiated with the laser such that the processing rate in wet etching is increased at that place as compared with that at a place which has not been irradiated. Accordingly, a concave lens array can be manufactured directly in the surface of the glass substrate 1 through the aforementioned step, that is, the laser modification step in which a high-density electric field caused by the aforementioned ultrashort pulsed laser is formed in a partial region in the thickness direction of the glass substrate 1. In this manner, the diffusion element 10 in each example in which a concave lens array constituted by a plurality of concave aspheric lenses 2 were formed directly on the glass substrate 1 was obtained.

Figure 14:
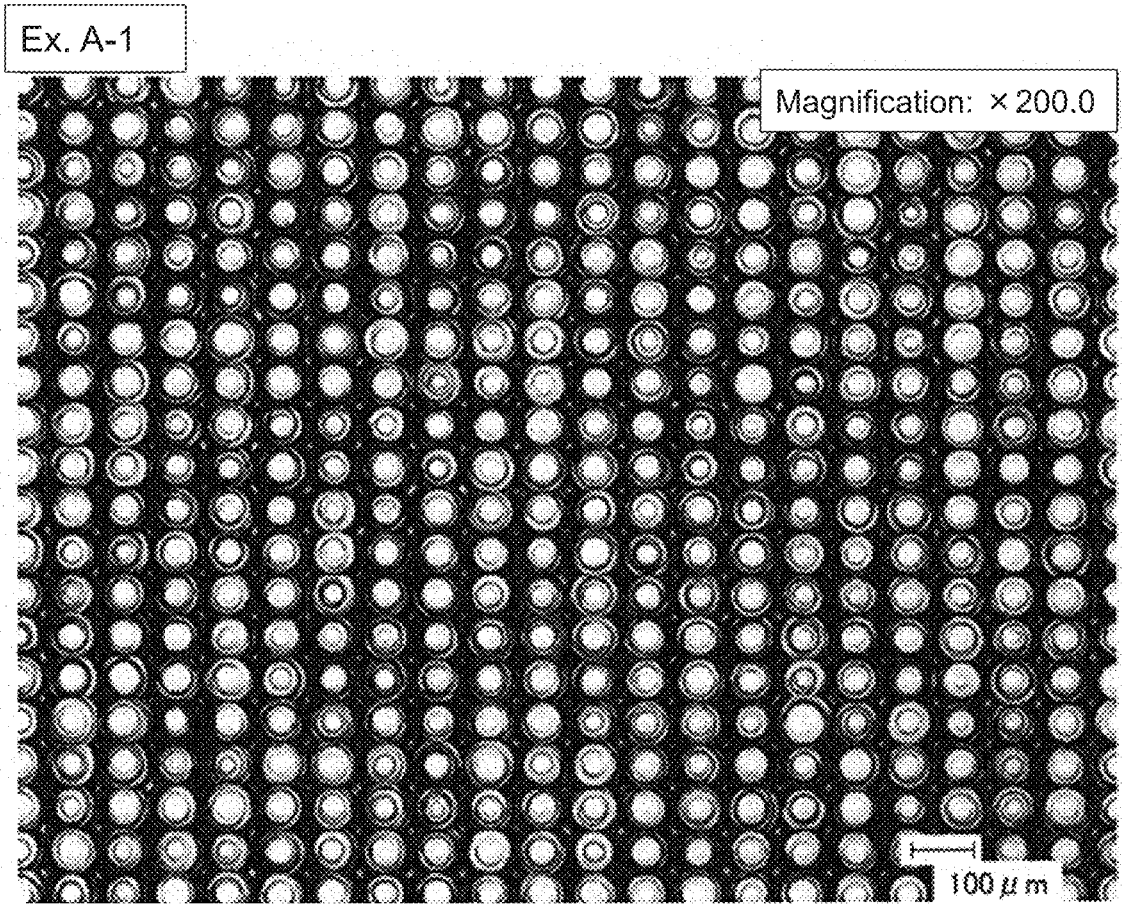
FIG. 14 is a top view of a diffusion element in Example 1-1.

FIG. 14 is a top view of the diffusion element 10 in Example 1-1 manufactured by the aforementioned method. FIG. 14 is a view from the opposed surface (corresponding to the aforementioned surface $f_2$) to the surface where the concave lens array was formed in the diffusion element 10.

Figure 15:
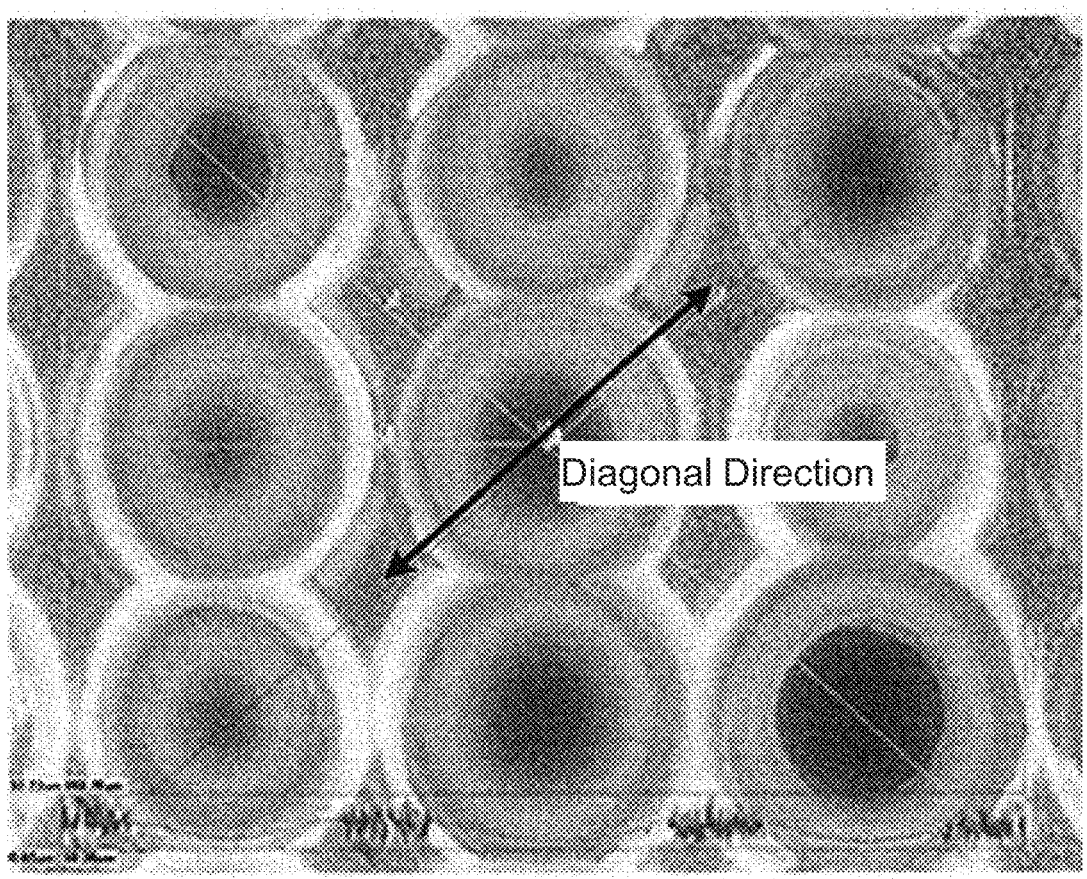
FIG. 15 is an image observed by a laser microscope in Example 1-1.
Figure 16A:
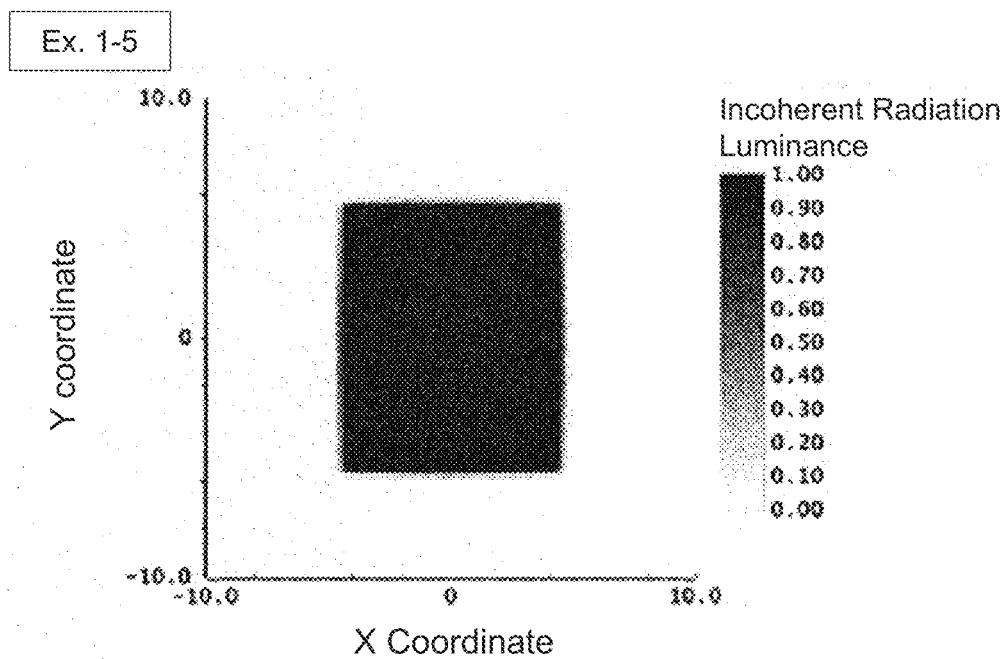
FIG. 16A and FIG. 16B are graphs showing light intensity distributions calculated by ray tracing simulation performed on Example 1-5 and Example 1-23.
Figure 16B:
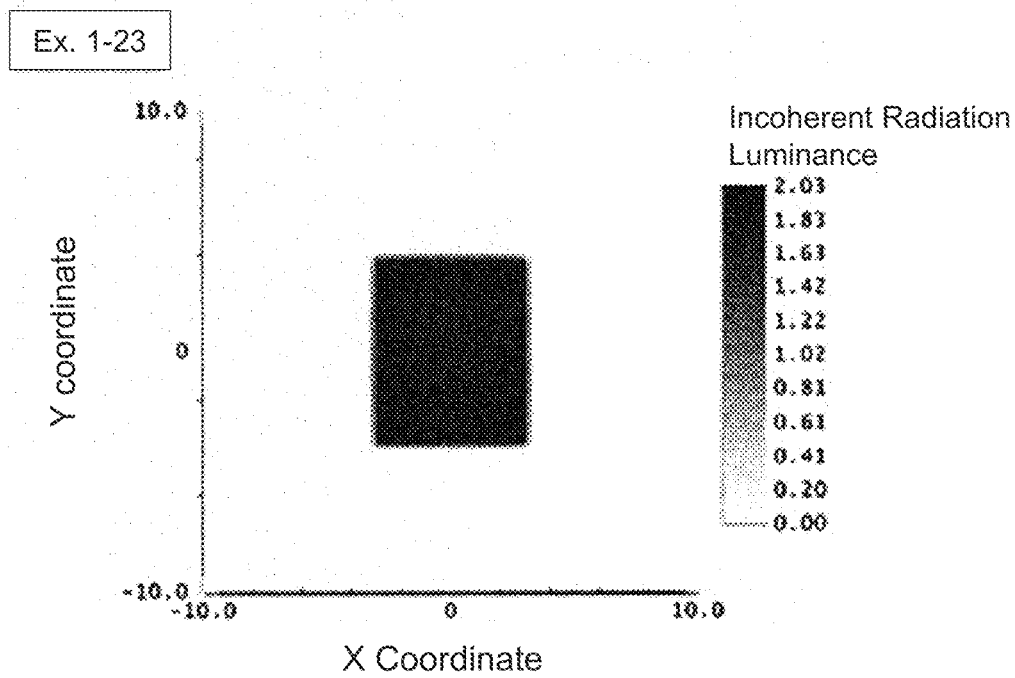
Figure 17A:
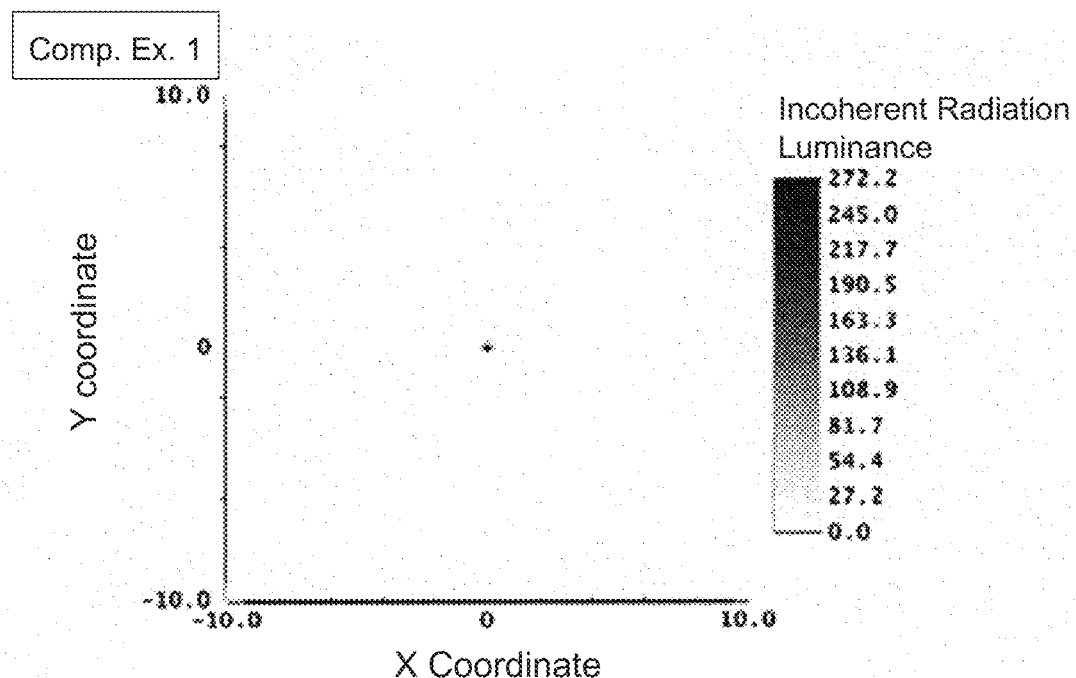
FIG. 17A and FIG. 17B are graphs showing light intensity distributions calculated by ray tracing simulation performed on Comparative Example 1 and Comparative Example 2.
Figure 17B:
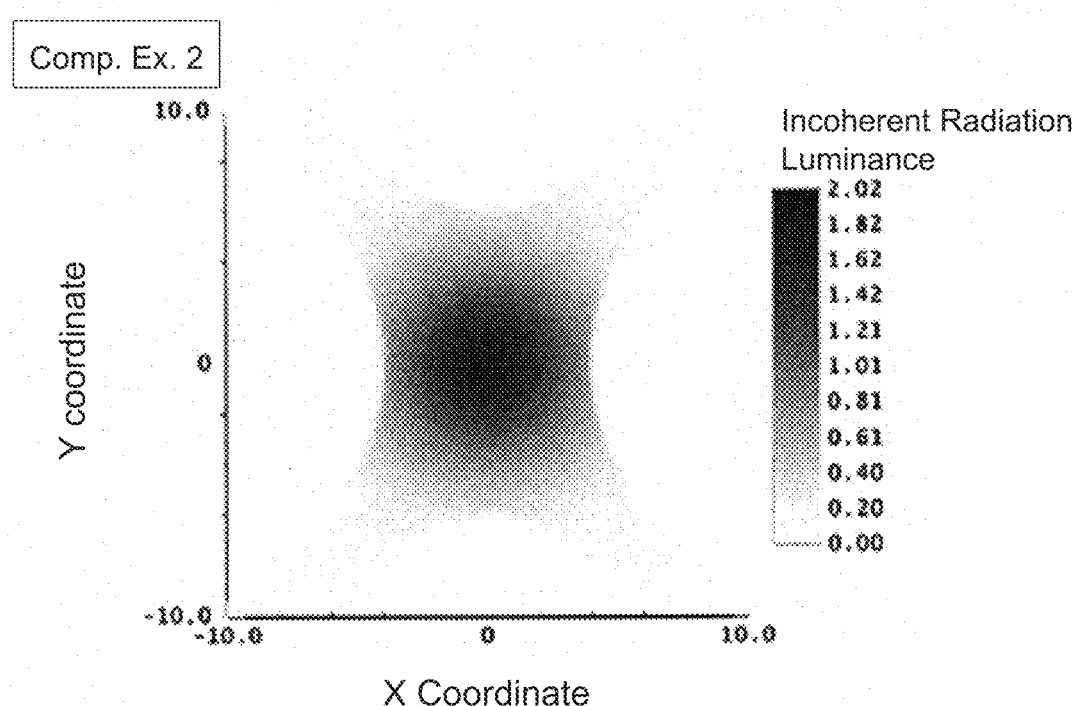

The shape of the concave lens array of the diffusion element 10 obtained in each example was measured by use of a laser microscope. Then, a profile passing through the center in the diagonal direction (see FIG. 15) of one of the aspherical lenses 2 was cut out, and fitting was performed by the aforementioned formula (2). Two fitting parameters, that is, the curvature radius R and the conic coefficient k were used. A least squares method was used for the fitting.

The aforementioned Table 4 shows the processing conditions, and shows the curvature radius R and the conic coefficient k as fitting results showing the shape of each aspheric lens 2 obtained in each example. As shown in Table 4, for example, an aspheric lens 2 close to a conic coefficient k=−1 was obtained in Example 1-5 and Example 1-23.

Next, ray tracing simulation was performed on Example 1-5 and Example 1-23. As a comparative example for each of them, a diffusion element having a concave lens array formed at the same processing pitch Px and Py on the glass substrate 1 having the same size and having a spherical shape (conic coefficient k=0) with the same curvature radius R was assumed. Set conditions and conic coefficients in the examples are shown in Table 5.

TABLE 5

| | processing pitch [μm] | | fitting results | |
|---|---|---|---|---|
| | $P_x$ | $P_y$ | R [mm] | k |
| Example 1-5 | 80 | 100 | 0.043 | −1.0 |
| Example 1-23 | 64.8 | 81 | 0.051 | −1.0 |
| Comparative Example 1 | 80 | 100 | 0.043 | 0 |
| Comparative Example 2 | 64.8 | 81 | 0.051 | 0 |

Incident light on each diffusion element was set as rays having a diameter of 0.5 mm in FWHM, a wavelength of 940 nm, and a circular Gaussian shape as incident beam shape. In addition, the side where the light was incident was set as a diffusion surface (that is, a surface where a concave lens array was to be formed). The thickness of the glass substrate 1 after the concave lens array was formed was set at 0.3 mmt. The light intensity distribution 100 mm behind the incident surface was calculated using the curvature radius and the conic coefficient in each example.

FIG. 16A, FIG. 16B, FIG. 17A and FIG. 17B are graphs showing light intensity distributions calculated by ray tracing simulation performed on Example 1-5, Example 1-23, Comparative Example 1 and Comparative Example 2 respectively. It is understood that uniform irradiation can be attained on the rectangular irradiation plane in Example 1-5 and Example 1-23. On the other hand, in Comparative Example 1, the irradiation range is too narrow and no diffusibility is obtained. In addition, in Comparative Example 2, the light intensity distribution is uneven, and the irradiation range has a shape in which the four corners project relatively to the center portions of the four sides. The shape is different from a rectangle. The diffusion angle in Example 1-5 was 72° (full angle), and the diffusion angle in Example 1-23 was 53.5° (full angle).

Figure 18:
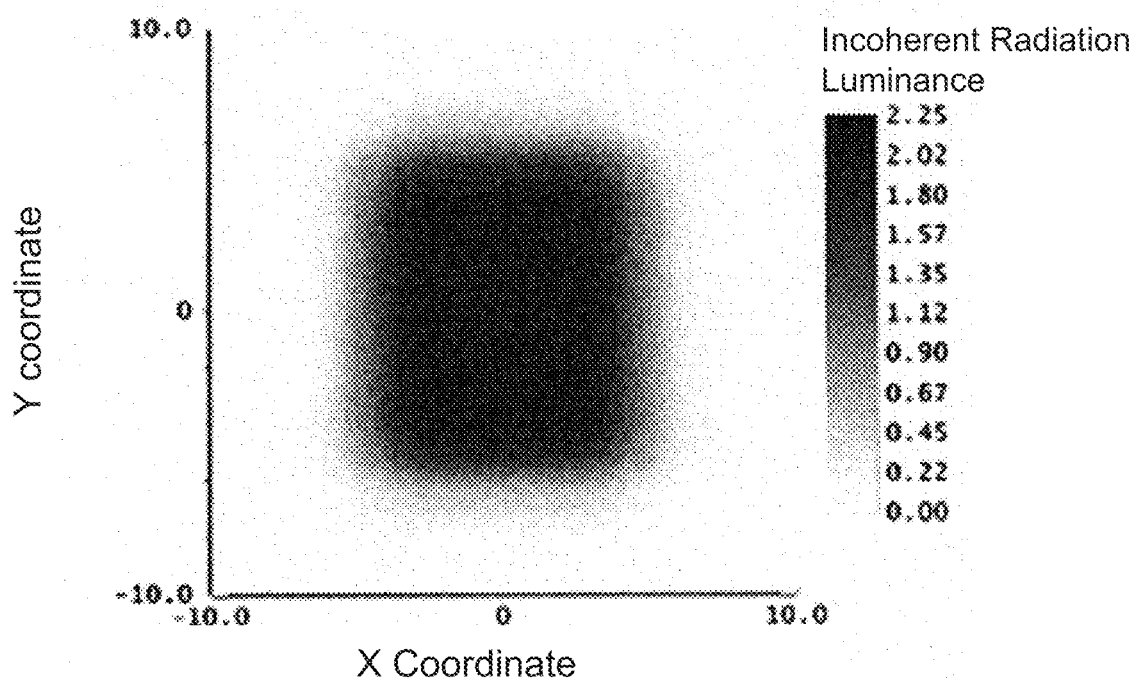
FIG. 18 is a graph showing a calculation result of light distribution simulation in which a diffusion element 10 in Example 1-5 was applied to a lighting module 100.
Figure 19A:
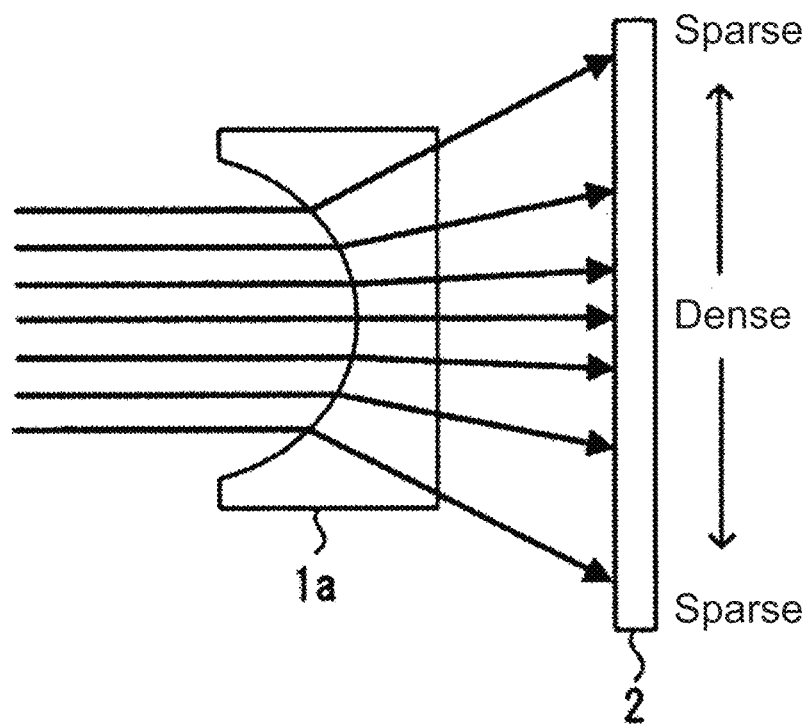
FIG. 19A and FIG. 19B are explanatory views each showing an example of a light quantity distribution of emitted light flux in aspheric lens and an aspheric lens.
Figure 19B:
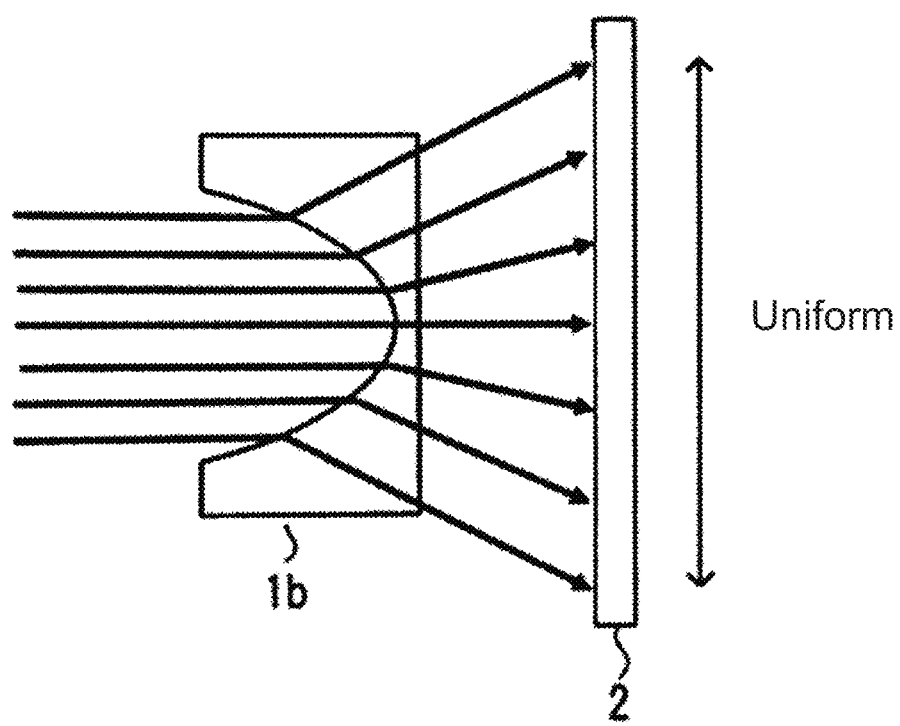
Figure 20A:
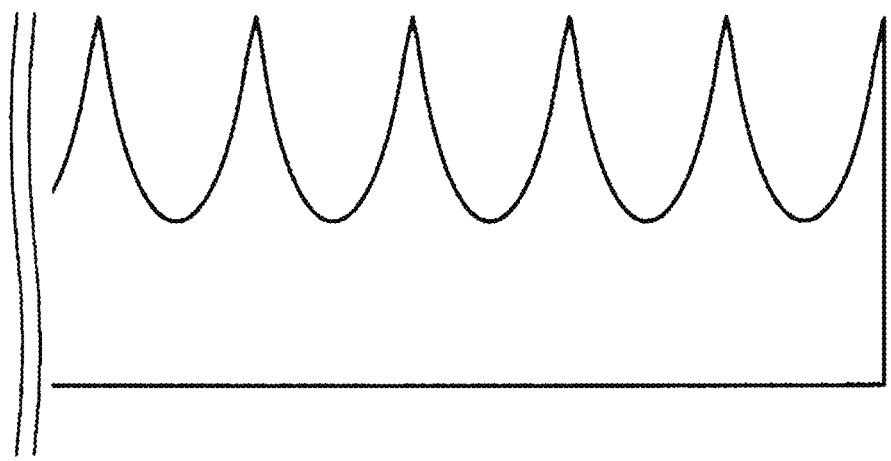
FIG. 20A and FIG. 20B are explanatory views showing an example of shape accuracy of aspheric lenses.
Figure 20B:
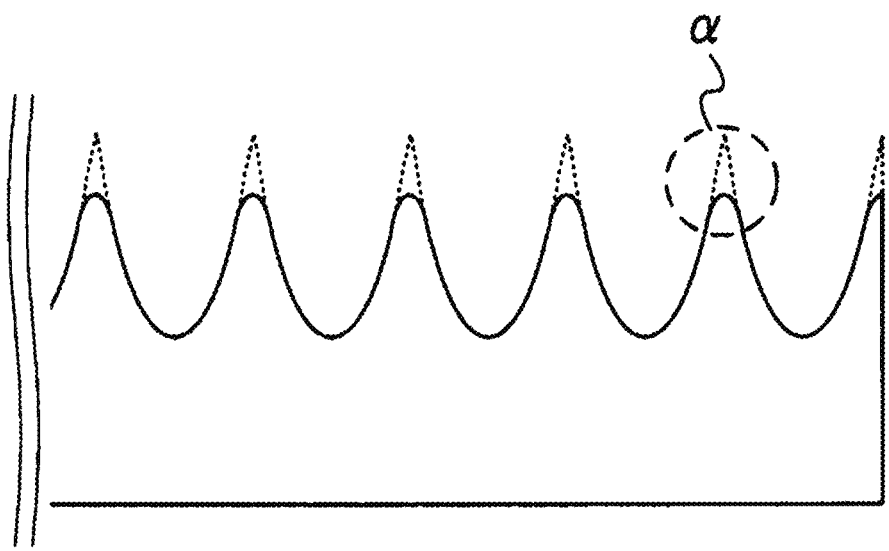

In addition, FIG. 18 is a graph showing a calculation result of light distribution simulation in which the diffusion element 10 in Example 1-5 was applied to the lighting module 100 including a surface emitting laser array (see FIG. 9). In the surface emitting laser array (light source 5), 11×11 emitters were disposed at an emitter-to-emitter pitch of 50 μm. The distance between the emitters and the diffusion element 10 (corresponding to $h_2$ in FIG. 9) was set at 0.4 mm, and the plate thickness of the diffusion element 10 (corresponding to $h_1$ in FIG. 9) was set at 0.4 mmt. In addition, the divergence angle of the light source was set at 10° in FWHM.

FIG. 18 shows a calculation result of an intensity distribution on a certain irradiation plane as to light radiated by the lighting module 100 in the example. In FIG. 18, the intensity distribution was calculated on an irradiation plane 10 mm behind the divergence surface of the diffusion element 10 (the light incident surface in the diffusion element 10). As shown in FIG. 18, it is understood that the cut-off property of the intensity distribution deteriorates as compared with incidence of parallel light (FIG. 16A), but a flat top distribution can be maintained. In the example, the divergence angle of light emitted from the diffusion element 10 was 73.0° (full angle).

In the aforementioned embodiments and examples, the focus position $L_f$ of the laser in the laser modification step is expressed by using the surface $f_2$ as zero reference. The surface $f_2$ is a surface on which a pulsed laser beam is incident. However, the focus position of the laser can be expressed by using the surface $f_1$ as zero reference, the surface $f_1$ being a surface where aspheric lenses are to be formed. By using the surface $f_1$ as zero reference, the relationship between the focus position of the laser and the lens shape of each aspheric lens can be expressed independently of the thickness of the glass substrate 1 as follows. For example, the laser focus distance $L_f$=1.075 mm in Example 1-5 can be expressed as the laser focus distance +0.075 mm when the surface $f_1$ is used as zero reference. In addition, for example, the laser focus distance $L_f$=0.710 mm in Example 1-23 can be expressed as the laser focus distance −0.290 mm when the surface $f_1$ is used as zero reference.

While the present invention has been described in detail and with reference to specific embodiments thereof, it will be apparent to one skilled in the art that various changes and modifications can be made therein without departing from the spirit and scope thereof. This application is based on Japanese Patent Application No. 2018-058867 filed on Mar. 26, 2018, the entire subject matters of which are incorporated herein by reference.

INDUSTRIAL APPLICABILITY

The present invention can be applied suitably to an environment requiring resistance to heat or resistance to high energy light and particularly to applications where a wide range should be irradiated with light.

REFERENCE SIGNS LIST

1 glass substrate
11 modified region 10 diffusion element
100 lighting module
2 aspheric lens
21 lens surface
22 concave portion
3 pulsed laser beam
31 objective lens
4 mount board
5 light source
6 frame material

The invention claimed is:

1. A method for processing into an aspheric lens, comprising:
preprocessing on a glass substrate; and
wet etching on the glass substrate subjected to the preprocessing such that the glass substrate has a plurality of concave aspheric lenses formed directly in a surface of the glass substrate and that each of the concave aspheric lenses has an RMS value of a shape difference that is 0.1 µm or less,
wherein the preprocessing includes irradiating a certain position of the glass substrate with a pulsed laser beam such that a partial region inside the glass substrate is modified and a density distribution is generated in a thickness direction at the position irradiated with the pulsed laser beam, or forming a predetermined wedge-shaped concave portion in a surface of the glass substrate by a chemical or physical processing method and the concave aspheric lenses are positioned closely at least in an effective region of the surface of the glass substrate and have a maximum size of 250 µm or less such that a diffusion angle is 30° or more in full angle where the diffusion angle is a spread angle of emitted light flux when parallel light enters the effective region from the surface where the concave aspheric lenses are formed.

2. The method for processing into an aspheric lens according to claim 1, wherein the preprocessing is performed at a plurality of positions in the surface of the glass substrate.

3. The method for processing into an aspheric lens according to claim 1, wherein the wet etching is performed without using a resist mask.

4. The method for processing into an aspheric lens according to claim 1, wherein the pulsed laser beam is radiated to the glass substrate through an objective lens.

5. The method for processing into an aspheric lens according to claim 1, wherein when a surface of the glass substrate where the concave aspheric lens is to be formed is defined as a first surface, and a surface opposite to the first surface is defined as a second surface, the pulsed laser beam is radiated from the second surface of the glass substrate.

6. The method for processing into an aspheric lens according to claim 1, wherein when a surface of the glass substrate where the concave aspheric lens is to be formed is defined as a first surface, the first surface is used as zero reference, and a traveling direction of the pulsed laser beam is defined as + side,
the pulsed laser beam has a focus position within a range of from −0.290 mm to +0.075 mm.

7. The method for processing into an aspheric lens according to claim 1, wherein the pulsed laser beam has a pulse width of 10 ps or less and a power of 5.0 W or higher.

8. The method for processing into an aspheric lens according to claim 1, wherein at least one parameter of a focus position, irradiation time, and power of the pulsed laser beam is changed depending on a position where the preprocessing is performed.

9. The method for processing into an aspheric lens according to claim 1, wherein a relationship, k'<k, is satisfied where k' is a conic coefficient obtained by fitting a surface shape of the concave portion to an aspheric formula in which all of aspheric high-order coefficients are set at 0, and k is a conic coefficient of an aspheric shape of an aspheric lens to be formed.

10. The method for processing into an aspheric lens according to claim 1, wherein the concave portion includes no flat portion at a tip of the concave portion, or the concave portion has a flat portion having a width of 2 µm or less at the tip.

11. The method for processing into an aspheric lens according to claim 1, wherein the concave portion is formed by performing sandblasting, half-cut dicing, dry etching, or drilling on the surface of the glass substrate.

12. The method for processing into an aspheric lens according to claim 11, wherein abrasive grains in the sandblasting have a size of 20 µm or less.

13. The method for processing into an aspheric lens according to claim 11, wherein at least one parameter of the abrasive grain size, blasting time and a blasting pressure in the sandblasting is changed depending on a position where the preprocessing is performed.

14. A diffusion element, comprising:
a glass substrate having a plurality of concave aspheric lenses formed directly in a surface of the glass substrate such that each of the concave aspheric lenses has an RMS value of a shape difference that is 0.1 µm or less,
wherein the concave aspheric lenses are positioned closely at least in an effective region of the surface of the glass substrate and have a maximum size of 250 µm or less such that a diffusion angle is 30° or more in full angle where the diffusion angle is a spread angle of emitted light flux when parallel light enters the effective region from the surface where the concave aspheric lenses are formed.

15. The diffusion element according to claim 14, wherein each of the concave aspheric lenses has a concentric wave shape in front view.

16. The diffusion element according to claim 14, wherein each of the concave aspheric lenses has a maximum inclination angle of 30° or more.

17. The diffusion element according to claim 14, wherein each of the concave aspheric lenses has a concentric wave shape in front view, and each of the concave aspheric lenses has a maximum inclination angle of 30° or more.

18. A lighting module, comprising:
a light source;
a mount board on which the light source is mounted; and
a window member positioned the light source and has a diffusion function,
wherein the window member includes the diffusion element of claim 14.

19. The lighting module according to claim 18, wherein the window member has a diffusion surface having the diffusion function and positioned to face downward such that a distance between the light source and the diffusion surface of the window member is 0.3 mm or less.

20. The lighting module according to claim 18, wherein light radiated from the light source has a wavelength of 800 nm to 1,000 nm.

* * * * *